United States Patent
Dengler

(10) Patent No.: US 10,319,123 B2
(45) Date of Patent: Jun. 11, 2019

(54) SYSTEMS, DEVICES, AND METHODS FOR GENERATING MULTI-DIMENSIONAL GRAPHS USING BASE FUNCTION STRINGS AND COLOR VALUES

(71) Applicant: William James Dengler, Annapolis, MD (US)

(72) Inventor: William James Dengler, Annapolis, MD (US)

(*) Notice: Subject to any disclaimer, the term of this patent is extended or adjusted under 35 U.S.C. 154(b) by 71 days.

(21) Appl. No.: 15/480,968

(22) Filed: Apr. 6, 2017

(65) Prior Publication Data
US 2018/0293767 A1 Oct. 11, 2018

(51) Int. Cl.
*G06F 17/10* (2006.01)
*G06T 11/20* (2006.01)

(52) U.S. Cl.
CPC ........... *G06T 11/206* (2013.01); *G06F 17/10* (2013.01)

(58) Field of Classification Search
CPC . G06T 3/00–3/608; G06T 11/00–11/80; G06F 3/048–3/04897; G06F 17/2705; G06F 17/2775; G06F 17/2785
See application file for complete search history.

(56) References Cited

U.S. PATENT DOCUMENTS

| | | | | |
|---|---|---|---|---|
| 5,432,898 A * | 7/1995 | Curb | ..................... | G06T 11/203 345/443 |
| 5,970,144 A * | 10/1999 | Chan | ..................... | H04W 12/06 380/247 |
| 6,226,000 B1 * | 5/2001 | Richens | .................. | G06T 15/04 345/419 |
| 7,190,376 B1 * | 3/2007 | Tonisson | ................. | G06T 11/60 345/629 |
| 2003/0198382 A1 * | 10/2003 | Chen | ........................ | G06K 9/38 382/173 |
| 2006/0062471 A1 * | 3/2006 | Xu | ..................... | G06K 9/00422 382/186 |
| 2006/0274070 A1 * | 12/2006 | Herman | .................. | A63F 13/10 345/474 |
| 2008/0230200 A1 * | 9/2008 | Tompkins | ............. | D21F 11/006 162/289 |
| 2009/0122062 A1 * | 5/2009 | Kilpatrick | ................ | G06F 8/51 345/426 |
| 2013/0127889 A1 * | 5/2013 | Winnemoeller | ........ | G06T 17/20 345/582 |

(Continued)

OTHER PUBLICATIONS

Perlin, Ken. "An image synthesizer." ACM Siggraph Computer Graphics 19.3 (1985): 287-296. (Year: 1985).*

(Continued)

*Primary Examiner* — Daniel F Hajnik
(74) *Attorney, Agent, or Firm* — Heath Briggs; Greenberg Traurig

(57) ABSTRACT

Disclosed herein are embodiments of systems, devices, and methods for generating multi-dimensional color graphs. In one embodiment, a method comprises receiving a plurality of base function strings, each of the base function strings associated with a color base; parsing the base function strings to generate a matrix of functions; calculating, for each coordinate in a set of coordinates, a color value for the coordinate using the matrix of functions; generating a graph based on the calculated color values associated with each coordinate; and displaying the generated graph.

19 Claims, 13 Drawing Sheets

(56) References Cited

U.S. PATENT DOCUMENTS

2016/0142202 A1* 5/2016 Dai Zovi .............. H04L 9/0819
380/28

OTHER PUBLICATIONS

Bleiweiss, Avi, and Arcot Preetham. "Ashli—Advanced shading language interface." ACM Siggraph Course Notes(2003). (Year: 2003).*
"The Rendernnan Interface", Version 3.2, Jul. 2000 (Year: 2000).*

* cited by examiner

SYSTEMS, DEVICES, AND METHODS FOR GENERATING MULTI-DIMENSIONAL GRAPHS USING BASE FUNCTION STRINGS AND COLOR VALUES

BACKGROUND

Technical Field

Embodiments disclosed herein relate to the field of image processing and specifically to the field of generating multi-dimensional color graphs.

Description of Related Art

The representation of simple, two-dimensional graphs on two-dimensional surfaces is well-known. Since a two-dimensional function only requires two axes, such functions are easily represented by humans or computers on a two-dimensional surface such as a chalkboard or a computer display. Three-dimensional functions, while requiring an additional axis generally represented at an angle from a traditional two-axis graph, are similarly capable of being represented by computers and, with some difficulty, capable of being represented by humans.

Notably however, two-dimensional representations of higher order graphs (e.g., four or five dimensional graphs) are not easily depicted by current techniques. Indeed, current techniques require complicated and counter-intuitive display models to represent four- or five-dimensional space. These methods are often times limited in the types of four- or five-dimensional functions they can display due to the complex nature of the underlying display mechanisms. Often, current techniques for displaying higher order graphs require displaying on portions of the graph or representing the graphs as algebraic formulas which fail to clearly depict the graphs in an intuitive manner.

Thus, there currently exists a need in the art for systems, devices, and methods for displaying multi-dimensional graphs in an easy to understand and intuitive manner. Furthermore, there exists a need to represent four- and five-dimensional functions of arbitrary complexity in an easy to understand manner.

BRIEF SUMMARY

To remedy the aforementioned deficiencies, the disclosure describes systems, devices, and methods for generating multi-dimensional color graphs. The disclosed embodiments generally allow users to enter function strings of arbitrary complexity wherein each function has dependent spatial variables (e.g., an x and y coordinate) and generates multiple independent variables corresponding to color bases (e.g., RGB values). In some embodiments, the calculated color values may be offset or saturated/de-saturated in response to user input. In some embodiments, the calculated color values may additionally be mapped to an output space using a divisional or logarithmic mapping.

In one embodiment, a method comprises receiving a plurality of base function strings, each of the base function strings associated with a color base; parsing the base function strings to generate a matrix of functions; calculating, for each coordinate in a set of coordinates, a color value for the coordinate using the matrix of functions; generating a graph based on the calculated color values associated with each coordinate; and displaying the generated graph.

Additionally disclosed herein is an apparatus comprising one or more processors; and a non-transitory memory storing computer-executable instructions therein that, when executed by the processors, cause the apparatus to perform the operations of: receiving a plurality of base function strings, each of the base function strings associated with a color base; parsing the base function strings to generate a matrix of functions; calculating, for each coordinate in a set of coordinates, a color value for the coordinate using the matrix of functions; generating a graph based on the calculated color values associated with each coordinate; and displaying the generated graph.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
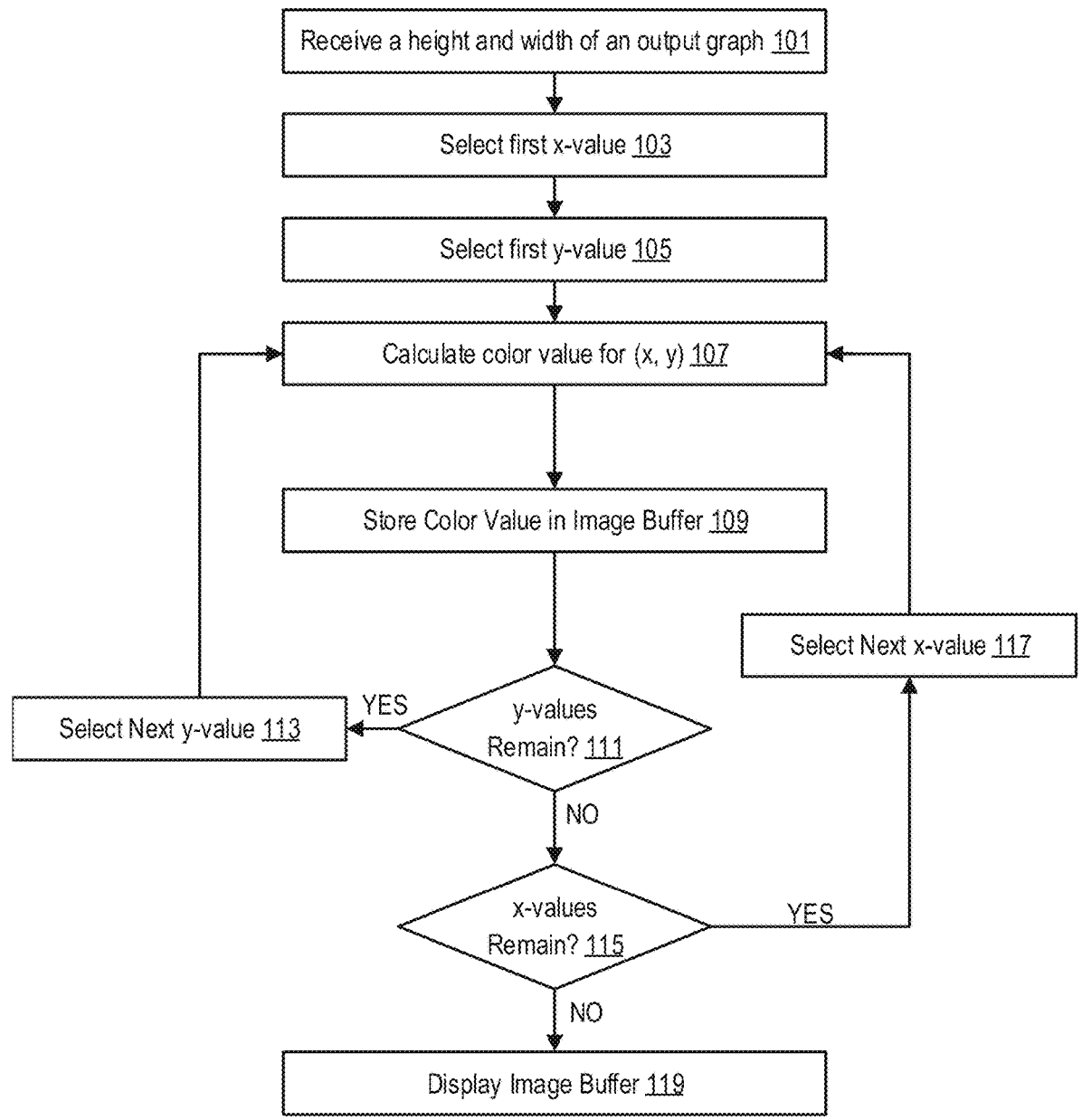
FIG. 1 is a flow diagram illustrating a method of generating a multi-dimensional color graph according to some embodiments of the disclosure.

FIG. 1 is a flow diagram illustrating a method of generating a multi-dimensional graph according to some embodiments of the disclosure.

In step 101, the method receives a height and width of an output graph.

Figure 6A:
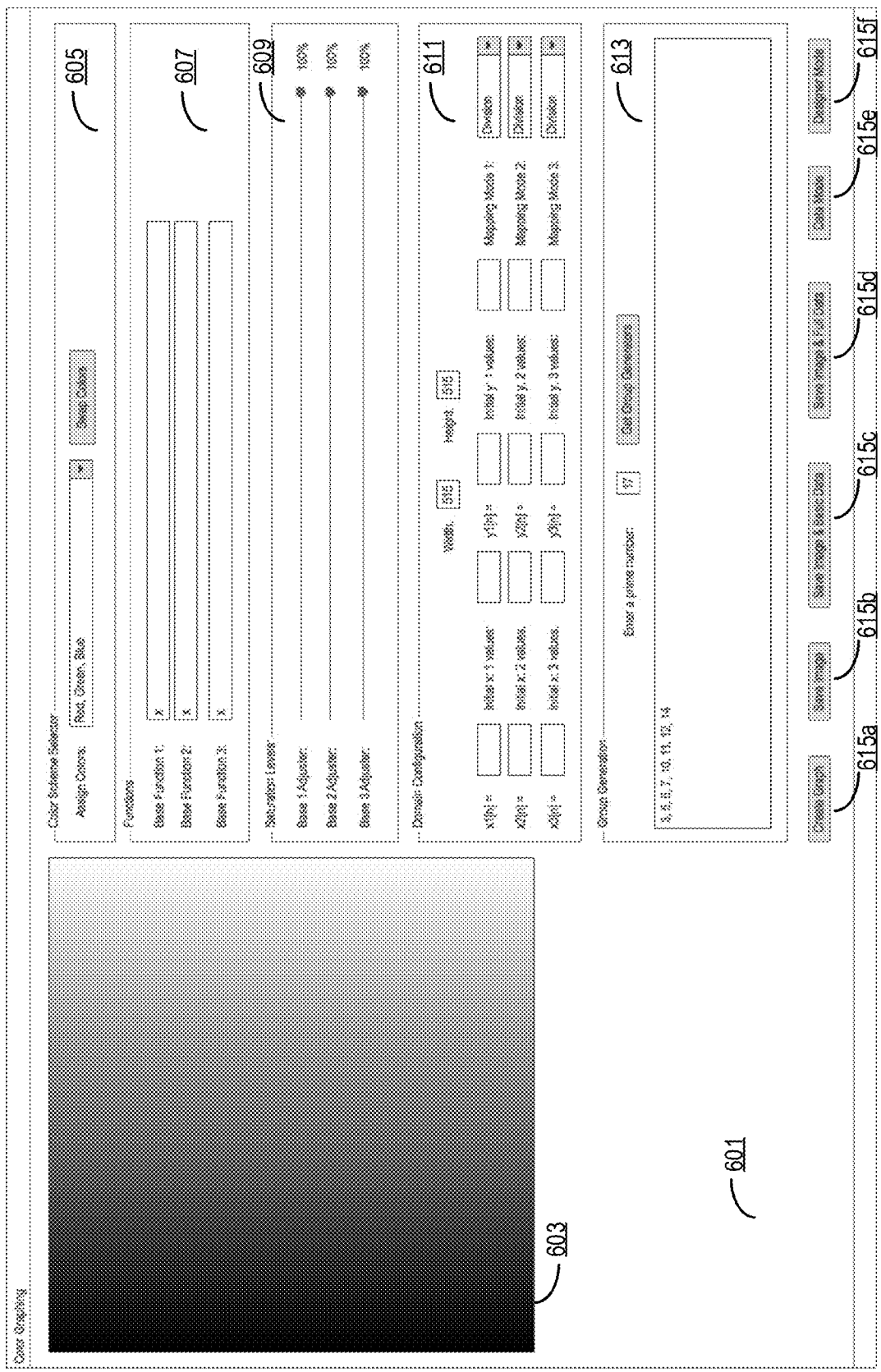
FIGS. 6A through 6C illustrate user interfaces for generating multi-dimensional color graphs according to some embodiments of the disclosure.
Figure 6B:
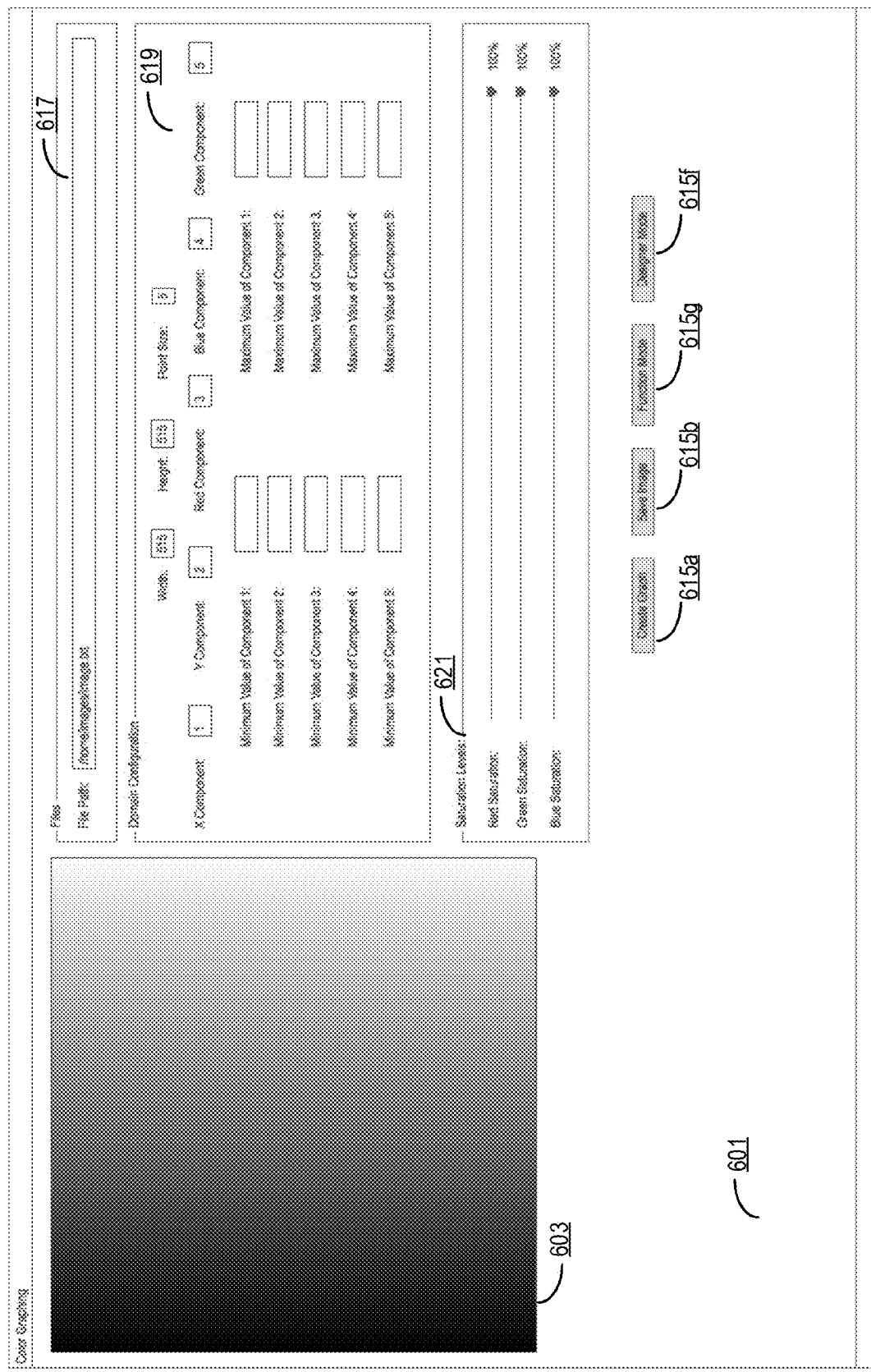
Figure 6C:
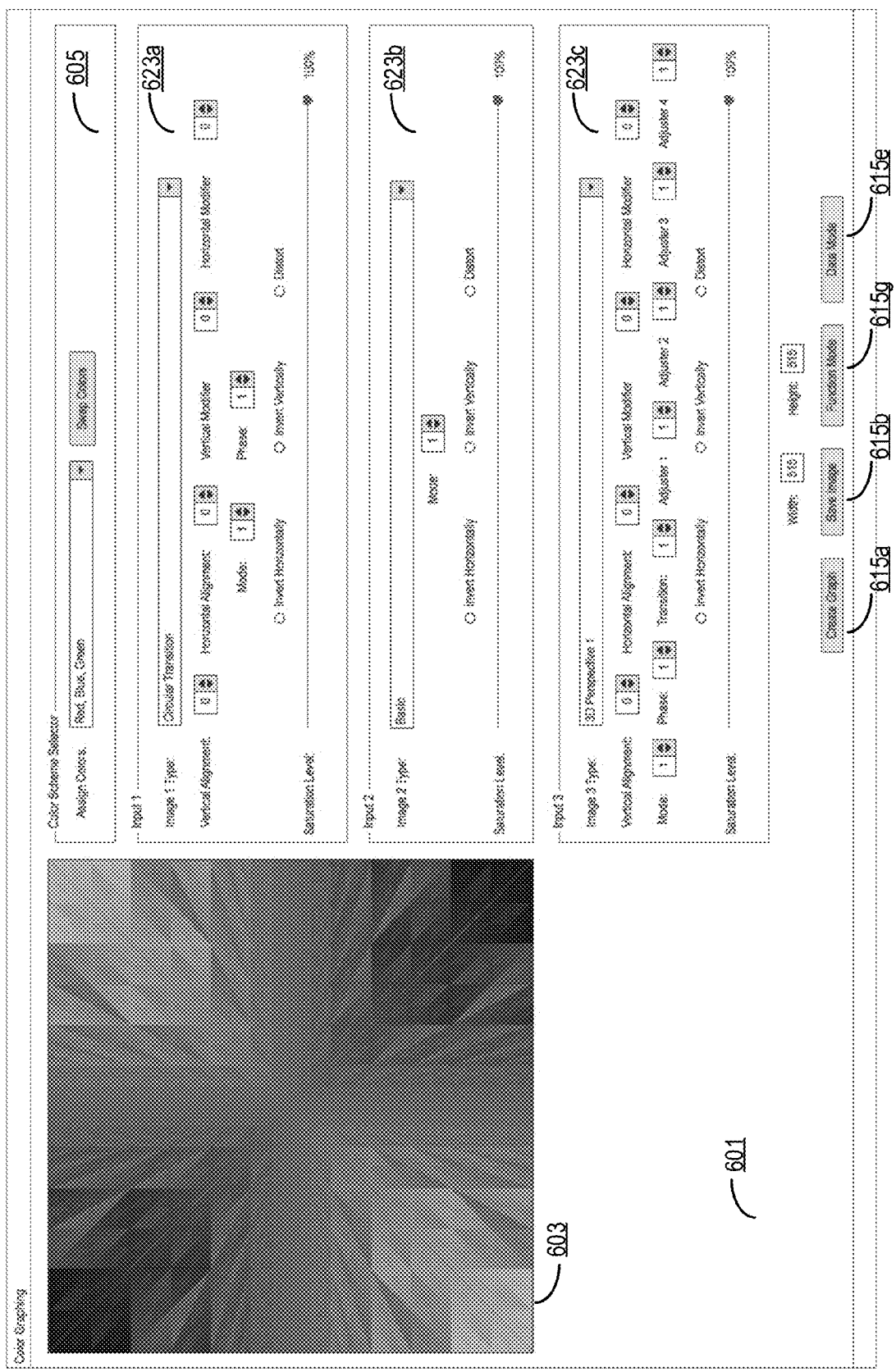

In one embodiment, a height and width are received via one or more user interface elements presented to a user via a user interface (such as those depicted in FIGS. 6A through 6C). For example, a user interface may include a text field for the height and a text field for width of the desired graph. In alternative embodiments, the height and width of the output graph are determined programmatically. For example, an application may calculate the available space of an output device and may set the height and width of the output graph based on the available space (or a portion thereof).

In steps 103 and 105, the method selects a first x-value and y-value, respectively.

In some embodiments, a first x-value and y-value corresponds to the origin of the graph, that is, the point (0, 0). In some embodiments, the point (0, 0) corresponds to the top-most and left-most point of a two-dimensional graph. In alternative embodiments, the initial x-value and y-value correspond to a point other than the origin (e.g., if the graph is offset by a fixed amount along each axis). In these embodiments, the steps described herein may "wrap" around the origin and result in the final x-value and y-value corresponding to a point immediately preceding the initial x-value and y-value.

In step 107, the method calculates a color value for the point (x, y).

As described in more detail herein, each point on a two-dimensional graph is associated with a defined color value. In some embodiments, the color value associated with a point is expressed in red-green-blue ("RGB") format. In alternative embodiments, the color value is expressed in cyan-magenta-yellow ("CMY") format. In other embodiments, the color value may be expressed in any format capable of representing a color value (e.g., HSL, HSV, HCL, CIEXYZ, CIELAB, YPbPr, CMYK, etc.). Alternatively, or in conjunction with the foregoing, the color value can include a transparency value or other modifying value that modifies the color value. In alternative embodiments, color values may be expressed in permutations of RGB or CMY (e.g., Green, Blue, Red; Blue, Red, Green; Magenta, Yellow, Cyan; etc.).

Specific embodiments of a method for calculating a color value are described more fully herein, the description of which is incorporated herein by reference in their entirety.

In step 109, the method stores the color value in an image buffer.

In one embodiment, an image buffer stores a coordinate (e.g., an (x, y) coordinate) and the computed color value for the coordinate. In some embodiments, an image buffer is initialized prior to storing color values. For example, the image buffer can be initialized with a single, uniform color value (e.g., white or black). In some embodiments, an image buffer can be creating using an instance of a Buffered Image object using the setRGB method of the object in the Java™ programming language.

In step 111, the method determines if any y-values remain.

In some embodiments, determining whether any y-values remain comprises determining if a counter exceeds the received height of the output graph.

In step 113, the method selects the next y-value if the method determines y-values remain to be processed.

In some embodiments, selecting a next y-value comprises incrementing a counter and selecting the value of the counter as the next y-value.

In step 115, the method determines if any x-values remain.

In some embodiments, determining whether any x-values remain comprises determining if a counter exceeds the received width of the output graph.

In step 117, the method selects the next x-value if the method determines x-values remain to be processed.

In some embodiments, selecting a next x-value comprises incrementing a counter and selecting the value of the counter as the next x-value.

Steps 111 and 115 allow for the method to step through each point in a two-dimensional graph and, in steps 107 and 109, calculate and store the color value for the two-dimensional point.

In step 119, the method displays the image buffer.

In one embodiment, displaying the image buffer comprises initializing the output graph with a single color (e.g., black or white). In some embodiments, displaying the image buffer comprises iterating through each (x, y) coordinate of the image buffer and updating a graphing element of a user interface with the color value of the image buffer at the (x, y) coordinates. For example, an output graph may be represented as a JLabel object and the object may be updated with an ImageIcon object in the Java™ programming language. Alternatively, or in conjunction with the foregoing, the method may calculate an origin offset when plotting a color graph.

In some embodiments, the method may only display a subset of the graph. For example, the size of the graph may be larger than the displayable area of a window. In this embodiment, the method may allow a user to select the graph and open a new window which displays the entire graph. In some embodiments, the method may further detect a user event in connection with the graph and perform an action based on the user event. For example, the method may detect a mouseover event and display the color values for the point underlying the user's mouse cursor.

In some embodiments, the method may further allow users to save or load graph data from disk. In one embodiment, the method may allow a user to save the generated graph as an image file (e.g., a JPEG, PNG, or GIF image). Alternatively, or in conjunction with the foregoing, the method may allow the user to export the underlying graph data to a plain text or binary file. In some embodiments, an exported file may store each color value for each base for each point in the graph. In some embodiments, the method may allow a user to "load" a graph based on the exported data. In some embodiments, the exported data file includes which bases included in the image (e.g., the assigned color bases for each axis), which function string each base utilizes, the size of the graph in pixels, the (x, y) point that the graph was centered on, the height and width scalers used to produce the graph, and the percentages of each color distribution adjuster used to produce the graph. One example of an exported file is as follows:

Bases:
    base 1=Cyan;
    base 2=Yellow;
    base 3=Magenta;
Functions:
    Cyan(x, y)=d log [127,57,(xor[(x),(y)])];
    Yellow(x, y)=d log [97,5,(xor[(x),(y)])];
    Magenta(x, y)=xor[(x^2),(y^2)];
Size:
    Height: 487 pixels;
    Width: 487 pixels;
Cyan Domain: x[n]=n; Initial values=
y[n]=n; Initial values=
Yellow Domain: x[n]=n; Initial values=
y[n]=n; Initial values=
Magenta Domain: x[n]=n; Initial values=
y[n]=n; Initial values=
Domain Mappings:
Cyan mapping: Division;
    Yellow mapping: Division;
    Magenta mapping: Division;
Color Distribution Adjusters:
    Cyan saturation level: 100%;
    Yellow saturation level: 100%;
    Magenta saturation level: 100%;

Alternatively, or in conjunction with the foregoing, exported data can also includes a list containing the functional output and adjusted functional output for each base for every (x, y) coordinate in the graph. One example of an exported file with additional output is as follows:

---

Bases:
    base 1 = Cyan;
    base 2 = Yellow;
    base 3 = Magenta;
Functions:
    Cyan(x, y) = dlog[127,57,(xor[(x),(y)])];
    Yellow(x, y) = dlog[97,5,(xor[(x),(y)])];

```
    Magenta(x, y) = xor[(x^2),(y^2)];
Size:
    Height: 487 pixels;
    Width: 487 pixels;
Cyan Domain: x[n] = n; Initial values =
y[n] = n; Initial values =
Yellow Domain: x[n] = n; Initial values =
y[n] = n; Initial values =
Magenta Domain: x[n] = n; Initial values =
y[n] = n; Initial values =
Domain Mappings:
    Cyan mapping: Division;
    Yellow mapping: Division;
    Magenta mapping: Division;
Color Distribution Adjusters:
    Cyan adjuster: 100%;
    Yellow adjuster: 100%;
    Magenta adjuster: 100%;
Function Output:
    X[0] = 0; Y[0] = 0;   Cyan = (-1, 1.0);
    X[0] = 0; Y[0] = 0;   Yellow = (-1, 1.0);
    X[0] = 0; Y[0] = 0;   Magenta = (0, 1.0);
    X[0] = 0; Y[1] = 0;   Cyan = (0, 0.99206346);
    X[0] = 0; Y[1] = 0;   Yellow = (0, 0.9999962);
    X[0] = 0; Y[1] = 0;   Magenta = (1, 0.9895833);
    ...
```

The methods described in connection with FIG. 1 may be repeated in order to update a graph. In some embodiments, the methods may be re-executed upon a change in the height/width of the graph or in a change in one or more functions defining the calculation of a color value.

Using the aforementioned methods, a five-dimensional graph is capable of being represented via two-dimensional display in an intuitive manner. That is, a point (x, y) is associated with three values corresponding to, for example, red, blue, and green values. Thus, changes in color can be utilized to represent three dimensions while the (x, y) coordinates represent the additional two dimensions. Thus, generally, a graph created using the methods described above can intuitively describe a function having the form $f(x, y, a, b, c)$ where a, b, and c represent orthogonal color values (e.g., RGB or CMY values). In alternative embodiments, more or fewer color values may be used. For example, a color value may be limited to only red values or only red and green values to generate a three- or four-dimensional graph, respectively.

Figure 2:
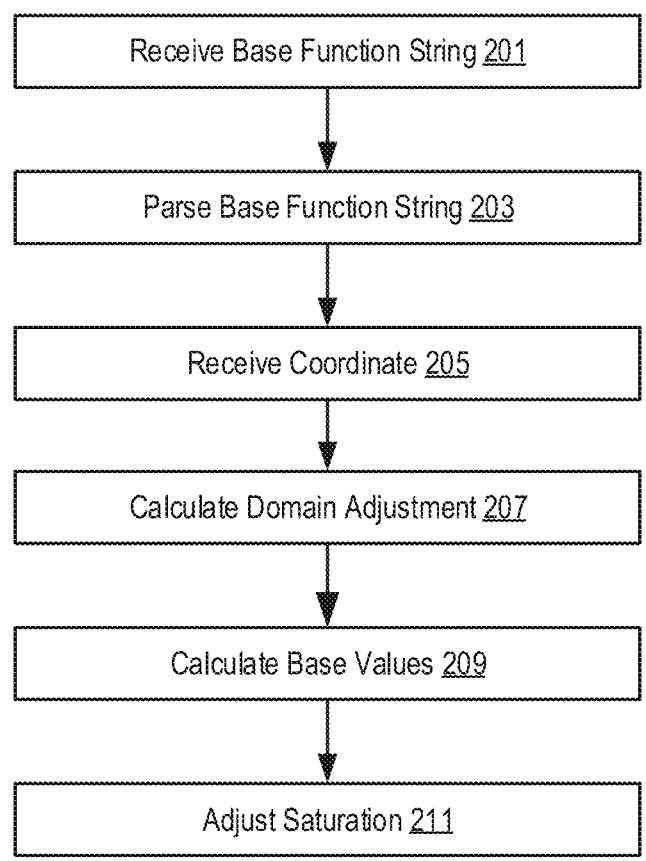
FIG. 2 is a flow diagram illustrating a method for computing a color value according to some embodiments of the disclosure.

FIG. 2 is a flow diagram illustrating a method for computing a color value according to some embodiments of the disclosure.

In step 201, the method receives a base function string.

In some embodiments, the method receives a base function string via a text input field presented as part of a user interface. In some embodiments, a base function string received by the method includes a textual string.

In step 203, the method parses the base function string.

In one embodiment, the method is configured to receive a text string and convert the text string into an operative matrix of functions. In some embodiments, the method may utilize a parser to convert the text string into an abstract syntax tree or other logical form as described more fully in connection with FIG. 3.

In some embodiments, a base function may be represented by the equation:

$$base_k(x, y) = \sum_{i=0}^{n}\left(\prod_{j=0}^{m_i} f_{ij}(x, y)\right)$$

where $f_{ij}(x, y)$ is a supported function (discussed herein), n≥0, and ∀i, $m_i$≥0. In operations discussed in connection with FIG. 3, each function $f_{ij}(x, y)$ is separated by multiplicative delimiter (e.g., a "*" character) and each product is separated by a linear delimiter (e.g., a "+" character).

Thus, when representing, for example, three color bases, a multi-dimensional function may be represented as $$F(x,y) = <base_1(x,y), base_2(x,y), base_3(x,y)>$$

where $base_1(x, y)$, $base_2(x, y)$, and $base_3(x, y)$ correspond to supported functions described herein.

In some embodiments, supported functions include basic functions, trigonometric functions, logic functions, and cryptographic functions.

In one embodiment, the basic functions include a constant function having the form $f(x, y)=r$, where r is any terminating rational number in decimal form. In one embodiment, if $base_k(x, y)=c \forall x, y$, for some constant c≠0, then the output of $base_k(x, y)$ will be 1, and can be scaled within range [0,1] by using a corresponding color distribution adjustment (discussed herein). Alternatively, or in conjunction with the foregoing, If $base_k(x, y)=0 \forall x, y$, then $base_k(x, y)$ will have no effect on the resulting color value.

In one embodiment, the basic functions include a polynomial function having the form $f(x, y)=x^k * y^j$ for any integers k, j. In one embodiment, $0^{-k}=0$ for any natural number k.

In one embodiment, the basic functions include a floor function having the form $f(x, y)=floor(f(x, y))=f(x, y)$ rounded down to the nearest integer; where $f(x, y)$ is any supported function.

In one embodiment, the basic functions include a ceiling function having the form $f(x, y)=ceil(f(x, y))=f(x, y)$ rounded up to the nearest integer; where $f(x, y)$ is any supported function.

In one embodiment, the basic functions include a log function having the form $f(x, y)=log(base=f_1(x,y), input=f_2(x,y))=log[f_1(x,y), f_1(x,y)]$. In one embodiment, the log function computes the logarithm (base $f_1(x,y)$ of the value returned by function $f_2(x,y)$.

In one embodiment, the basic functions include an absolute value function having the form $f(x, y)=|(f(x, y))|=\{f(x, y) \forall x, y$ such that $f(x, y) \geq 0$; $-1*f(x, y) \forall x, y$ such that $f(x, y)<0\}$, where $f(x, y)$ is any supported function.

In one embodiment, the basic functions include a modulus function having the form $f(x, y)=mod[(f_1(x, y)), (f_2(x, y))]=f_1(x, y)$ modulo $f_2(x, y)$=the remainder of $f_1(x, y)$ when divided by $f_2(x, y)$; where $f_1(x, y)$ and $f_2(x, y)$ are any supported functions.

In one embodiment, the basic functions include a "self" function having the form $f(x, y)=f(x, y)^k=f(x, y)$ raised to the power of k; where k is any integer, and $f(x, y)$ is any supported function. In one embodiment, $f(x, y)^{-k}=0 \forall x, y$ such that $f(x, y)=0$ and k is any natural number.

In one embodiment, the trigonometric functions include a sine function having the form $f(x, y)=sin^k(f(x, y))$, where k is any integer, and $f(x, y)$ is any supported function. In one embodiment, $sin^{-k}(f(x, y))=0 \forall x, y$ such that $sin(f(x, y))=0$ and k is any natural number.

In one embodiment, the trigonometric functions include a cosine function having the form $f(x, y)=cos^k(f(x, y))$, where k is any integer, and $f(x, y)$ is any supported function. In one embodiment, $cos^{-k}(f(x, y))=0 \forall x, y$ such that $cos(f(x, y))=0$ and k is any natural number.

In one embodiment, the trigonometric functions include a tangent function having the form $f(x, y)=tan^k(f(x, y))$, where k is any integer, and $f(x, y)$ is any supported function.

In one embodiment, $\tan\hat{\ }-k(f(x, y))=0 \forall x, y$ such that $\tan(f(x, y))=0$ and k is any natural number.

In one embodiment, the trigonometric functions include a cosecant function having the form $f(x, y)=\csc\hat{\ }k(f(x, y))$, where k is any integer, and $f(x, y)$ is any supported function. In one embodiment, $\csc\hat{\ }-k(f(x, y))=0 \forall x, y$ such that $\sin(f(x, y))=0$ and k is any natural number.

In one embodiment, the trigonometric functions include a secant function having the form $f(x, y)=\sec\hat{\ }k(f(x, y))$, where k is any integer, and $f(x, y)$ is any supported function. In one embodiment, $\sec\hat{\ }-k(f(x, y))=0 \forall x, y$ such that $\cos(f(x, y))=0$ and k is any natural number.

In one embodiment, the trigonometric functions include a cotangent function having the form $f(x, y)=\cot\hat{\ }k(f(x, y))$, where k is any integer, and $f(x, y)$ is any supported function. In one embodiment, $\cot\hat{\ }-k(f(x, y))=0 \forall x, y$ such that $\tan(f(x, y))=0$ and k is any natural number.

In one embodiment, the logic functions include an and function having the form $f(x, y)=\text{and } [(f_1(x, y)), (f_2(x, y))]=\text{floor}(f_1(x, y)) \wedge \text{floor}(f_2(x, y))=$bitwise—and of floor $(f_1(x, y))$ and floor$(f_2(x, y))$; where floor$(f_i(x, y))=f_i(x, y)$ rounded down to the nearest integer, and $f_i(x, y)$ is any supported function.

In one embodiment, the logic functions include a or function having the form $f(x, y)=\text{or}[(f_1(x, y)), (f_2(x, y))]=\text{floor}(f_1(x, y)) \vee \text{floor}(f_2(x, y))=$bitwise-or of floor$(f_1(x, y))$ and floor$(f_2(x, y))$; where floor$(f_i(x, y))=f_i(x, y)$ rounded down to the nearest integer, and $f_1(x, y)$ is any supported function.

In one embodiment, the logic functions include a not function having the form $f(x, y)=\text{not}(f(x, y))=\neg\text{floor}(f(x, y))=$bitwise-negation of floor$(f(x, y))$; where floor$(f(x, y))=f(x, y)$ rounded down to the nearest integer, and $f(x, y)$ is any supported function.

In one embodiment, the logic functions include an xor function having the form $f(x, y)=\text{xor}[(f_1(x, y)), (f_2(x, y))]=\text{floor}(f_1(x, y)) \oplus \text{floor}(f_2(x, y))=$bitwise-exclusive-or of floor$(f_1(x, y))$ and floor$(f_2(x, y))$; where floor$(f_i(x, y))=f_i(x, y)$ rounded down to the nearest integer, and $f_1(x, y)$ is any supported function.

In one embodiment, the logic functions include an implies function having the form $f(x, y)=\text{implies}[(f_1(x, y)), (f_2(x, y))]=\text{floor}(f_1(x, y)) \Rightarrow \text{floor}(f_2(x, y))=$bitwise-implies of floor$(f_1(x, y))$ and floor$(f_2(x, y))$; where floor$(f_i(x, y))=f_i(x, y)$ rounded down to the nearest integer, and $f(x, y)$ is any supported function.

In one embodiment, the logic functions include an if_and_only_if function having the form $f(x, y)=\text{iff}[(f_1(x, y)), (f_2(x, y))]=\text{floor}(f_1(x, y)) \Leftrightarrow \text{floor}(f_2(x, y))=$bitwise-if_and_only_if of floor$(f_1(x, y))$ and floor$(f_2(x, y))$; where floor$(f_1(x, y))=f_1(x, y)$ rounded down to the nearest integer.

In one embodiment, the cryptographic functions include a discrete logarithm function having the form $f(G, g, x, y)=\text{d log }[G, g, (f(x, y))]=$the discrete logarithm, base g, of floor$(f(x, y))$ within group G; where G is any prime number (e.g., representing the cyclic group of integers under multiplication modulo G); g is any generator of the group, floor$(f(x, y))=f(x, y)$ rounded down to the nearest integer, and $f(x, y)$ is any supported function. In one embodiment, d log $[G, g, (f(x, y))]=-1$ whenever $[f(x, y)$ modulo $g]=0$.

In one embodiment, the cryptographic functions include a Diffie-Hellman function having the form $f(G, g, x, y)=\text{dh}[G, g, (f_1(x, y)), (f_2(x, y))]=(\text{floor}(f_2(x, y)))\hat{\ }(\text{d log }[G, g, f_1(x, y)])=(\text{floor}(f_1(x, y)))\hat{\ }(\text{d log }[G, g, f_2(x, y)])$; where G is any prime number (e.g., representing the cyclic group of integers under multiplication modulo G); g is any generator of the group, d log $[G, g, f_2(x, y)]$ is the discrete logarithm within G, base g, of $f(x, y)$ as described above, floor$(f_i(x, y))=f(x, y)$ rounded down to the nearest integer, and $f(x, y)$ is any supported function. In one embodiment, dh$[G, g, (f_1(x, y)), (f_2(x, y))]=0$ whenever $[(f_1(x, y)$ modulo $g]=0$ or $[f_2(x, y)$ modulo $g]=0$.

Alternatively, or in conjunction with the foregoing, a function may be a custom function. In one embodiment, a custom function comprises a function created and stored by the user, for example, as a text file. In some embodiments, a custom function comprises a piece-wise function stored as a text file in a directory.

In some embodiments, a custom function includes an identifier or name of the function. In some embodiments, the custom function may also include the names of inputs to the custom function (e.g., input1, input2 . . . inputN). In some embodiments, the inputs to a custom function may comprise any supported function (including other custom functions). In some embodiments, a custom function can include as many inputs as necessary so long as the input names are unique. In some embodiments, the text file defining the custom function includes a series of mapping statements that define the output values for various coordinate input into the custom function. In some embodiments, the output values are calculated by executing the input functions for a received coordinate. In some embodiments, a mapping statement includes an output value (or, alternatively, or in conjunction with the foregoing, supported function) and a conditional statement that inspects the results of executing an input function for a given coordinate. In some embodiments, the conditional statement may use any equality operator to compare the results of the input function to a constant output or a functional output.

In some embodiments, the custom function additionally includes a default output value to return if no conditions in the mapping statements are met. In some embodiments, the default output value may be a constant or the result of an execution of one or more input functions for a given coordinate. In some embodiments, a custom function may have no mapping statements but must always include a default condition so as to return a value for all valid coordinates. Examples of custom functions are illustrates below.

The following is a first example of a custom function:

```
my_fractal
input1, input2
  (0) if (input1) == (0)
  (0) if (input1) == (1)
  (0) if (input2) == (0)
``` de-Fault: (1) In this custom function, the name of the function is "my_fractal" and may be executed by referencing this name. The custom function takes two inputs (input1, and input2) that may be any supported function. Thus, in some embodiments, a user may call the function by executing a command such as "my_fractal[(y), (x)]" or "my_fractal[and(y,x), or(y,x)]", etc.

Next, the custom function identifies multiple conditional mapping statements. For example, if the custom function is called by calling "my_fractal[(y), (x)]", in the first statement, when executed, the custom function will evaluate the function "(y)" for each point in a color graph and determine if the output of that function is equal to zero. Thus, at all points (n, 0), the conditional will be true and the custom function will return zero. Likewise illustrated is a default conditional. If none of the conditional mappings in my_fractal match a matching statement, the custom function returns 1.

Below is a second, more complex example of a custom function:

```
my_func
input1, input2
(xor[(input1), (input2)]) if (input1) > (input2)
(and[(input1), (input2)]) if (mod[(input1),(50)]) >= (2)
(iff[(input1), (input2)]) if (input1*input2) < (input1)
(or[(input1), (input2)]) if (dlog[97, 5, (input1)]) <= (input1)
(implies[(input1), (input2)]) if (input1) == (input2)
default: (not(input1 + input2))
```

As illustrated, the function is named "my_func" and takes two supported input functions (input1, input2). The default output value is assigned to the function not(input1+input2). Thus, if input1 is equal to (y) and input2 is equal to (x), the default output value will be not(y+x) for all values x, y.

The mapping statements for "my_func" each include more complex mapping functions. For example, the first statement (for input1=(y) and input2=(x)) would determine if the output of input1 is greater than the output of input2 (i.e., whether y is greater than x). If so, the custom function would return the value of the exclusive or of the outputs of input1 and input2 (i.e., xor[y, x]) for each coordinate x, y.

The preceding examples are presented as examples only and the name of a custom function, the number of inputs, the number of mapping (and default) statements, and the contents of each mapping statement and the default statement may vary according to the needs of the custom function.

As described above, cryptographic functions require generators to be calculated prior to application of the function. In some embodiments, the method produces a list of every generator element of the group of integers under multiplication modulo p, where p is any prime number, for use in the cryptographic functions. In one embodiment, the method may receive a prime number from a user (e.g., entered into a text box). In response, the method may calculate a set of generators based on the received prime number as discussed above. The method may display the generators via a text area containing a comma separated list of the generators of the group of integers under multiplication modulo p, where p is the prime number received by the method.

Figure 3:
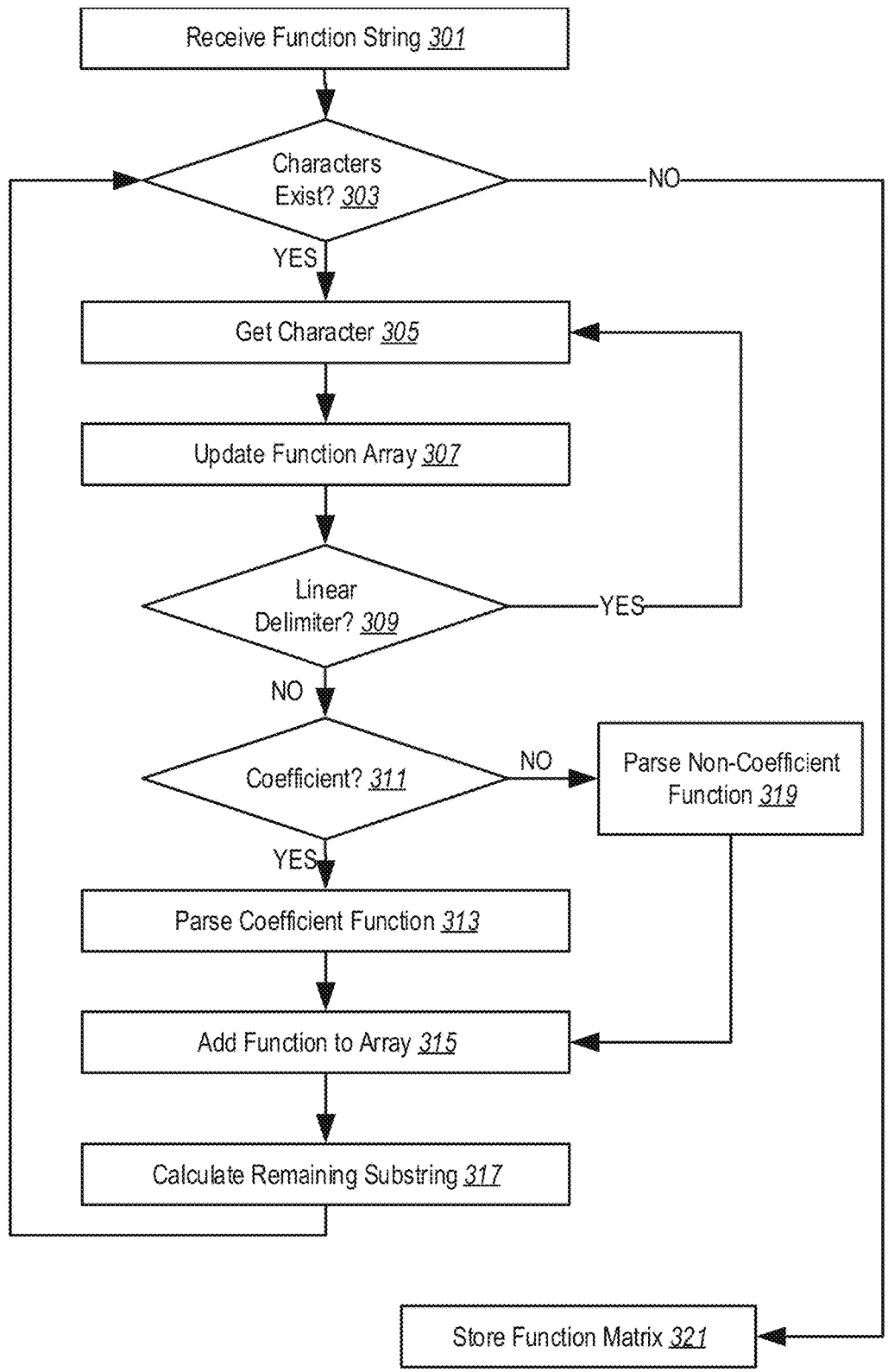
FIG. 3 is a flow diagram illustrating a method of parsing a function string according to some embodiments of the disclosure.

Embodiments of a method for parsing a text base function are described more fully in connection with FIG. 3, the disclosure of which is incorporated herein by reference in its entirety.

In alternative embodiments, various other methods may be used to calculate a base function for a given color base. In one embodiment, as described previously, a base function may be loaded from an exported graph. In this embodiment, the method may extract the base function(s) from the exported file and utilize the string representation of the base function(s) from the exported file. Alternatively, in some embodiments, the exported file may include the color values for each coordinate. In this embodiment, the method may bypass the method illustrated in FIG. 3 and proceed to iterate through each computed base value.

In another embodiment, the method in FIG. 3 may utilize a set of pre-defined base functions. In this embodiment, the user may be presented with a dropdown menu of pre-defined function templates that represent templates constructed in a manner similar to those described previously. That is, the pre-defined function templates may correspond to a textual string of supported functions that may be customized by a user. The pre-defined templates may include basic, circular transition, fluid transition, rays, puddles, patterns, fractal, circuit board, squares, or 3D perspective transitions each associated with one or more template strings (discussed below).

Examples of templates are provided below and are intended to be illustrative only and not exhaustive.

Basic Template:

A basic template may comprise a function string chosen from "0", "1", "x", "|x|", "y" or "|y|." The string may be chosen via a mode selector.

Circular Transition Template:

A circular transition template may comprise a function string chosen from one of "$(x^2+y^2)^i$" or "$not((x^2+y^2)^i)$". Selection of the function string may be chosen via a mode selector. Further, the power i may be chosen via a stepper or other user interface component.

Fluid Transition Template:

A fluid transition template may comprise a function string chosen from one of "$c1*x^3+c2*y^3+c3*x^2*y+c4*x*y^2 c5*x^2+c6*y^2+c7*x*y+c8*x+c9*y)$" or "$|c1*x^3 a*y^3+c3*x^2*y+c4*x*y^2+c5*x^2+c6*y^2+c7*x*y+c8*x+c9*y)|$." Selection of the function string may be chosen via a mode selector. Further, each coefficient c1 through c9 may be configured via a stepper or other user interface component. In some embodiments, the templates employ a constraint where each coefficient is between −500 and 500, inclusive.

Rays Template:

A rays template may comprise a function string chosen from one of "$mod[(c1*x^i),(c2*y^j)]$", "$not(mod[(c1*x^i),(c2*y^j)])$", "$mod[(c1*y^i),(c2*x^j)]$", or "$not(mod[(c1y^i),(c2*x^j)])$". In some embodiments, the templates may employ the following constraints: $-100 \leq c1$, $c2 \leq 100$, $1 \leq j \leq 25$.

Puddles Template:

A puddles template may comprise a function string chosen from one of "$mod[(c1*x^i+c2*y^j),(c3)]$" or "$not(mod[(c1*x^i+c2*y^j))]$". Selection of the function string may be chosen via a mode selector. In some embodiments, the templates may employ the following constraints: $-100 \leq c1$, $c2 \leq 100$, $5 \leq c3 \leq 10000$, $2 \leq i$, $j \leq 20$. Selection of coefficients c1 and c2 and modulo c3 may be configured via a stepper or other user interface component.

Patterns Template:

A patterns template may include the function string "$trig((c1*x^2+c2*y^2)^i)$". In some embodiments, the templates may employ the following constraints: $-50 \leq c1$, $c2 \leq 50$ $1 \leq i \leq 15$. Selections of coefficients c1 and 2 and power i may be configured via a stepper or other user interface component.

Fractal 1 Template:

A fractal 1 template may comprise a function string chosen from one of "$d \log [G, g, (x^2+y^2)^a]$", "$not(d \log [G, g, (x^2+y^2)^a])$", "$\cos(d \log [G, g, (x^2+y^2)^a])$", "$\sin(d \log [G, g, (x^2+y^2)^a])$". In some embodiments, the templates may employ the following constraints: 1 a 25. Selection of the function string may be chosen via a mode selector. The group (G), generator (g), and power (a) may be chosen by the user via a stepper or other user interface component.

Fractal 2 Template:

A fractal 2 template may comprise a function string chosen from one of "$dh[G, g, (x^2+y^2)^a, (x^2+y^2)^b]$", "$\sin(dh[G, g, (x^2+y^2)^a, (x^2+y^2)^b])$", "$\cos(dh[G, g, (x^2+y^2)^a, (x^2+y^2)^b])$", "$not(dh[G, g, (x^2+y^2)^a, (x^2+y^2)^b])$". In some embodiments, the templates may employ the following constraints: $1 \leq a, b \leq 25$. Selection of the function string may be chosen via a mode selector. The group (G), generator (g), and powers (a, b) may be chosen by the user via a stepper or other user interface component.

Fractal 3 Template:

A fractal 3 template may comprise a function string chosen from one of "logic[dh[G1, g1, $(x^2+y^2)^a$, $(x^2+y^2)^b$], dh[G2, g2, $(x^2+y^2)^c$, $(x^2+y^2)^d$]]", "sin(logic[d log [G1, g1, $(x^2+y^2)^a$], d log [G2, g2, $(x^2+y^2)^b$]])", "cos(logic[d log [G1, g1, $(x^2+y^2)^a$], d log [G2, g2, $(x^2+y^2)^b$]])", "not(logic[d log [G1, g1, $(x^2+y^2)^a$], d log [G2, g2, $(x^2+y^2)^b$]])", where "logic" refers to one of the "xor", "if_and_only_if", "implies", "or", "and" or "mod" functions, selectable by the user. In some embodiments, the templates may employ the following constraints: $1 \leq a, b \leq 25$. Selection of the function string may be chosen via a mode selector. The groups (G1, G2), generators (g1, g2), and powers (a, b) may be chosen by the user via a stepper or other user interface component.

Fractal 4 Template:

A fractal 4 template may comprise a function string chosen from one of "logic[dh[G1, g1, $(x^2+y^2)^a$, $(x^2+y^2)^b$], dh[G2, g2, $(x^2+y^2)^c$, $(x^2+y^2)^d$]]" "sin(logic [dh[G1, g1, $(x^2+y^2)^a$, $(x^2+y^2)^b$], dh[G2, g2, $(x^2+y^2)^c$, $(x^2+y^2)^d$]])", "cos(logic[dh[G1, g1, $(x^2+y^2)^a$, $(x^2+y^2)^b$], dh[G2, g2, $(x^2+y^2)^c$, $(x^2+y^2)^d$]])", "not(logic[dh[G1, g1, $(x^2+y^2)^a$, $(x^2+y^2)^b$], dh[G2, g2, $(x^2+y^2)^c$, $(x^2+y^2)^d$]])", where "logic" refers to one of the "xor", "if_and_only_if", "implies", "or", "and" or "mod" functions, selectable by the user. In some embodiments, the templates may employ the following constraints: $1 \leq a$, b 25. Selection of the function string may be chosen via a mode selector. The groups (G1, G2), generators (g1, g2), and powers (a, b, c, d) may be chosen by the user via a stepper or other user interface component.

Circuit Board Template:

A circuit board template may comprise a function string chosen from one of "d log [G, g, logic1[logic2[x+y, y], logic3[x+y, x]]]", "sin(d log [G, g, logic1[logic2[x+y, y], logic3[x+y, x]]])", "cos(d log [G, g, logic1[logic2[x+y, y], logic3[x+y, x]]])", "not(d log [G, g, logic1[logic2[x+y, y], logic3[x+y, x]]])", where "logic1", "logic2" and "logic3" each refer to one of the "xor", "if_and_only_if", "implies", "or", "and" or "mod" functions, selectable by the user. Selection of the function string may be chosen via a mode selector. The group (G), and generator (g) may be chosen by the user via a stepper or other user interface component.

Squares Template:

A squares template may comprise the function string "logic[(c1*$x^i$*$y^j$), (c2*$x^a$*$y^b$)]" where "logic" refers to one of the "xor", "if_and_only_if", "implies", "or", "and" or "mod" functions, selectable by the user. In some embodiments, the templates may employ the following constraints: $n=i+j=a+b$, $i \neq a$, $-50 \leq c1 \leq 50$, $1 \leq n \leq 10$. The coefficients (c1, c2), and powers (a, b, i, j) may be chosen by the user via a stepper or other user interface component.

3D-Perspective 1 Template:

A 3D Perspective 1 template may comprise the function string "logic[mod[(c1*$x^a$*$y^b$), (c2*$x^c$*$y^d$)]), (mod [(c3*$x^e$*$y^f$), (c4*$x^g$*$y^h$)])]" where "logic" refers to one of the "xor", "if_and_only_if", "implies", "or", "and" or "mod" functions, selectable by the user. The coefficients (c1, c2, c3, c4), and powers (a-h) may be chosen by the user via a stepper or other user interface component. In some embodiments, the templates may employ the following constraints: $-500 \leq c1, c2, c3, c4 \leq 500$ and $1 \leq n=a+b=c+d=e+f=g+h \leq 10$.

3D-Perspective 2 Template:

A 3D Perspective 2 template may comprise the function string "logic[(c1*$x^a$*$y^b$), (mod[(c2*$x^c$*$y^d$), (c3*$x^e$*$y^f$)])]" where "logic" refers to one of the "xor", "if_and_only_if", "implies", "or", "and" or "mod" functions, selectable by the user. The coefficients (c1, c2, c3), and powers (a-f) may be chosen by the user via a stepper or other user interface component. In some embodiments, the templates may employ the following constraints: $-500 \leq c1, c2, c3 \leq 500$ and $1 n=a+b=c+d=e+f \leq 10$.

For each template, a user may be capable of configuring coefficients, powers, and other variables of pre-defined function templates as illustrated above. Once the user customizes the template, the method may construct the base function based on the parameters and the method may then proceed to parse the base function as described above. Each of the above template functions may further be configured to be inverted horizontally or vertically, or distorted (e.g., having their domains mapped divisionally or logarithmically).

In step 205, the method receives a coordinate.

In some embodiments, the method iterates through a two-dimensional set of coordinates as described more fully with respect to FIG. 1. Thus, in the illustrated embodiment, the method may receive a coordinate as part of iterating through a set of coordinates.

In step 207, the method calculates a domain adjustment.

In some embodiments, a domain adjustment may be set to zero. That is, the x and y values may be passed through to the base function. In alternative embodiments however, the domain of the x and y values may be adjusted in various ways.

In one embodiment, an axis domain may be adjusted by a fixed offset. For example, the method may be configured to map a set of default input values (e.g., 0 to width or height) to an offset set of input values (e.g., 100 to width or height+100). In some embodiments, this offset may be represented formulaically. For example, the default mapping may illustrated as x1[n]=n and an initial x1 value of 0. An offset domain may be indicated as x1[n]=n+100 and an initial x1 value of 100. Although described with respect to an x-coordinate, the same modifications may be made to a y-coordinate or other space coordinate. Alternatively, or in conjunction with the foregoing, a mapping may take the form of any supported function (e.g., "x1[n]=45*x+cos(x)").

In some embodiments, the domain may be computed divisionally (e.g., linearly) using an adjust value. In some embodiments, an adjust value may computed as the difference between the maximum output value and the minimum input value. In alternative embodiments, the mapping of domain inputs may be performed logarithmically. For example, when using a divisional mapping mode, the method shifts values to [0, adjust] by adding the minimum value to each value. The method may then map the values to the range [0, 1] by dividing by adjust value. Alternatively, when using a logarithmic mode, the method may shift values to [1, adjust value +1] by adding the minimum value and one to each value. The method may then map each value to [0, 1] by taking the log, base adjust +1, of each value.

Thus, step 207 may adjust the coordinates received in step 205 to an adjusted set of coordinates in step 207.

In step 209, the method calculates a base value for a given set of coordinates using the base function parsed in step 203. In some embodiments, the method utilizes the base function to generate a two-dimensional matrix of base values. For example, the two-dimensional matrix may comprise a matrix sized according to the height and width of the output graph.

As described above, calculating a base value may comprise executing the functions stored in a base function matrix. For example, the method may select a first row (or column) of the matrix and compute each of the functions for the received and adjusted coordinates. The method may then multiply each result of the row of functions to generate a linear term value. The method may then select the next row and perform the same operation on the row functions. The method may continue to perform this operation until calculating an array of linear term values. Finally, the method may sum the array of linear term values to calculate the base value for a given coordinate.

Notably, the method may calculate a base value solely according to the outputs of the parsed base function. Thus, the output of the base function may vary dependent on the structure of the formula. Notably, however, the method must adjust the calculated base value in order to adequately represent a color value. For example, a value of 500 for a given coordinate is not a valid red value in the RGB model.

In order to compensate for the variance in computed values, the method, in some embodiments, maintains a running count of the maximum and minimum computed values. The method may then compute the range of the calculated values and utilize this range to translate the calculated values into a range between 0 and 1. Thus, in some embodiments, the base values of the two-dimensional matrix comprise floating point values between 0 and 1, inclusive.

In step 211, the method adjusts the saturation of the calculated base values. In some embodiments, adjusting the saturation comprises multiplying the base value for a given coordinate by a constant floating point adjustment value between 0 and 1.

Notably, the illustrated embodiment depicts the processing of a color value for a single function (e.g., a single color base). As described in connection with FIG. 1, the method illustrated in FIG. 2 may be executed for multiple color bases (e.g., for red, green, and blue color bases).

Finally, the method may store the computed base values in an image buffer for further processing and display as discussed in connection with FIG. 1.

FIG. 3 is a flow diagram illustrating a method of parsing a function according to some embodiments of the disclosure.

In step 301, the method receives a function string.

As described previously, a function string may be received via user input, exported file, or via a customized template. In general, the function string comprises a string of characters representing a defined transformation of x, y coordinates to a single output value using a combination of supported functions (discussed previously).

In step 303, the method determines if characters exist in the function string or substring (discussed herein). While in an initial execution the detection of an empty string may appear redundant, step 303 is re-executed as the initial function string is modified as will be discussed below. If no characters exist in the string or substring, the method stores identified functions within a function matrix (step 321), which will be discussed herein.

In step 305, the method gets a character from the function string.

In one embodiment, getting a character comprises extracting, for example, the first character of the string (e.g., the character at index 0).

In step 307, the method updates a function array. As described herein, updating a function array may comprise differing implementations depending on the state of the method.

During an initial execution, the method may initialize an empty array configured to store an array of functions at each element of the array. On an initial execution, the method (upon detecting a character) may initialize the last element of the one-dimensional array (also the first element) with an empty array, thus forming a 1×1 matrix.

In a second instance, the method may detect that an array exists at the current location of the array and may "update" the array stored at the location instead of creating a new, empty array.

Finally, when the method determines that a linear term has ended (discussed later in connection with step 309), the method may initialize a new, empty array at the end of the array.

Thus, step 307 allows for the creation of a two-dimensional (potentially jagged) matrix of function objects.

In step 309, the method detects whether the inspected character is a linear delimiter.

In one embodiment, a linear delimiter comprises a predefined character used to separate linear terms of a function. For example, a linear delimiter may be defined as a plus ("+") symbol.

If the detected character is linear delimiter, the method updates the function array again in step 307. As discussed above, upon detecting a linear delimiter the method may increment a counter which indicates the position of the method within the array. Thus, if the method is currently adding functions to the array at position zero of the array, the method may increment the counter to one and select the next character in step 305.

In step 311, the method determines if the character represents a coefficient function.

In one embodiment, a coefficient function comprises a numeric value or a minus sign. As described above, a coefficient function comprises a constant value.

In step 313, if the current character is a number of minus sign, the method parses the coefficient function.

In one embodiment, parsing a function (such as a coefficient function), the method may load the corresponding function object and initialize the function object with the current function string.

For coefficient functions, the method may step through each character of the function string until reaching a non-coefficient character (e.g., a "*", space, or "+" character). The method may then convert the identified characters into a numeric type and store this numeric type as an instance variable of the created function object. The method may then receive the function object configured according to the function string.

In step 315, the method adds the function to the current array of function objects (e.g., at the end of the array).

In step 317, the method calculates the remaining substring.

In some embodiments, a function object is configured to track the characters consumed by the object while it is parsing the received string. While consuming the portions of the function string required to initialize the function the function object stores a reference to the trailing input not required by the function object. Thus, in step 317, the method may query the current function object for the remaining input and set the function string as the return value of the function object. In this manner, each function object is responsible for consuming only the data necessary to initialize the object and to return the remaining function string.

As described previously, a function string may include a plurality of other operators.

In step 319, if the method determines that the current character is not indicative of a coefficient function, the method may proceed to parse the character as a non-coefficient function.

In one embodiment, parsing a non-coefficient function may comprise matching the character retrieved in step 305 to a table of known characters. For example, the character "x" may be mapped to the "xor" function but may also be mapped to a power function (e.g., as in "x^2"). Similarly, the character "c" may be mapped to the "cos", "csc", "cot", or "ceil" functions. Various other letter mappings may be utilized to map the input character to supported functions. In general, the first letter of each supported function may be utilized as a key in a mapping. The method then identifies the prefix of the function string to identify the specific function, thus forming a two-pronged filtering approach to identifying the specific function. In some embodiments, identifying a prefix may comprise identifying whether the function string begins with a known substring (e.g., the substrings "csc", "d log", etc.).

Once identifying the function, the method proceeds to initialize a supported function object associated with the identified function type. In some embodiments, initializing the object may be done in the manner discussed with respect to the coefficient function. That is, the current function string (or substring) is passed to an initializer of the function object, the parameters of the function are initialized, and the remaining function string is calculated and provided by the function object.

Notably however, parsing a non-coefficient function differs from parsing a coefficient function in certain aspects. First, a non-coefficient function may itself include one or more supported, non-coefficient functions. For example, the function sin(cos(x)) represents the non-coefficient function "sin" while the input to the sine function itself is a non-coefficient function. In these embodiments, the method may extract the operator ("sin") and parse the input of the function using the method described in steps 305 through 319. Thus, a non-coefficient function may include an array of non-coefficient functions (which in turn may include its own array of non-coefficient functions, etc.).

Additionally, each non-coefficient function may include various parameters associated with the initialized function object. For example, a trigonometric function may include a power (in addition to an array of function objects as input), a cryptographic function may include a group, generator, and log map. Generally, each function object corresponds to a supported function type described previously and stores (e.g., as instance variables) the required parameters to configured the function.

In step 321, the method stores the function matrix.

As described previously, the method may store each function object as a two-dimensional array of functions wherein one dimension corresponds to a linear term and the second dimension corresponds to terms within a linear term. For example, the function: "2*x+cos(sin(y))*tan(x)" may be represented as:

|   | 0 | 1 |
|---|---|---|
| 0 | Coefficient Function(2) | Cosine Function(sin(y)) |
| 1 | Power Function(x) | Tangent Function (x) |

An example of the method depicted in FIG. 3 is provided herein below.

In step 301, the method receives the string "45*cos(x)+sin(y)."

In step 303, the method determines that characters exist in the string and, in step 305, selects a character (i.e., the first character, "4").

The method next creates an empty array of functions at position zero of the array in step 307.

The method then checks, in step 309, to determine if the character is a linear term delimiter (e.g., a "+" sign). Upon determining that "4" is not a delimiter, the method then checks, in step 311, if "4" is a coefficient (e.g., a number or minus sign).

Since it is, the method, in step 313, parses a coefficient function for the value of the input string. As discussed above, the method iterates through the input string starting at the identified index (e.g., 0) until reaching a non-coefficient symbol (e.g., a space, plus sign, or multiply sign). Thus, the method identifies "45" as a coefficient (since "*" delimits the coefficient) and stores the coefficient as part of a coefficient function object.

In step 315, the method adds the function to the empty array of functions at position zero and calculates a remaining substring of the input in step 317. As described above, as part of parsing the coefficient function, the method removes the relevant characters from the total input string and returns a substring (e.g., "*cos(x)+sin(y)").

The method then checks if the substring is empty in step 303. Since it is not, the method retrieves the first character ("*") in step 305 and proceeds to re-execute steps 307 through 319. Notably, the character "k" is not a linear delimiter (step 309) or a coefficient (311) so the method parses the substring as a non-coefficient function (step 319). In this instance, the method ignores the symbol "k" as a joiner of multiplicative terms and proceeds to calculate the remaining substring (step 317) (i.e., "cos(x)+sin(y)"). In this embodiment, the method may skip step 315 for the character "k" and in step 317, may simply remove the character from the remaining function substring.

Again, the method re-executes steps 305 through 319 with the input string "cos(x)+sin(y)". In this instance, the method parses the string as a non-coefficient string (step 319) since the character retrieved in step 305 is "c" (i.e., not a number or "−" and not a linear delimiter). As described above, the method identifies the prefix "cos" and parses the substring a cosine function (e.g., iterating through the string until reaching the delimiter "+"). The method then adds a cosine function to the current array of functions (step 315) at position 0 since a linear delimiter has not been detected. The returned substring then is equal to the string "+sin(y)".

Again, the method re-executes steps 305 through 319 with the input string "+sin(y)". In this instance however, the method detects the presence of a linear delimiter ("+") and creates a new (e.g., second) function array in step 308 at position 1 of the array.

The method may then re-execute steps 305-319 for the remaining input ("sin(y)"). The execution of these steps is similar to the execution of the steps described with respect to the parsing of "cos(x)" and the description of these steps is not repeated herein for the sake of clarity.

Thus, after executing the above steps, the method eventually detects that no characters remain in the input substring and stores the function matrix in step 321. Thus, the method converts a textual string of "45*cos(x)+sin(y)" into a matrix of functions:

|   | 0 | 1 |
|---|---|---|
| 0 | Coefficient Function(45) | Sine Function(y) |
| 1 | Cosine Function(x) | |

Figure 4:
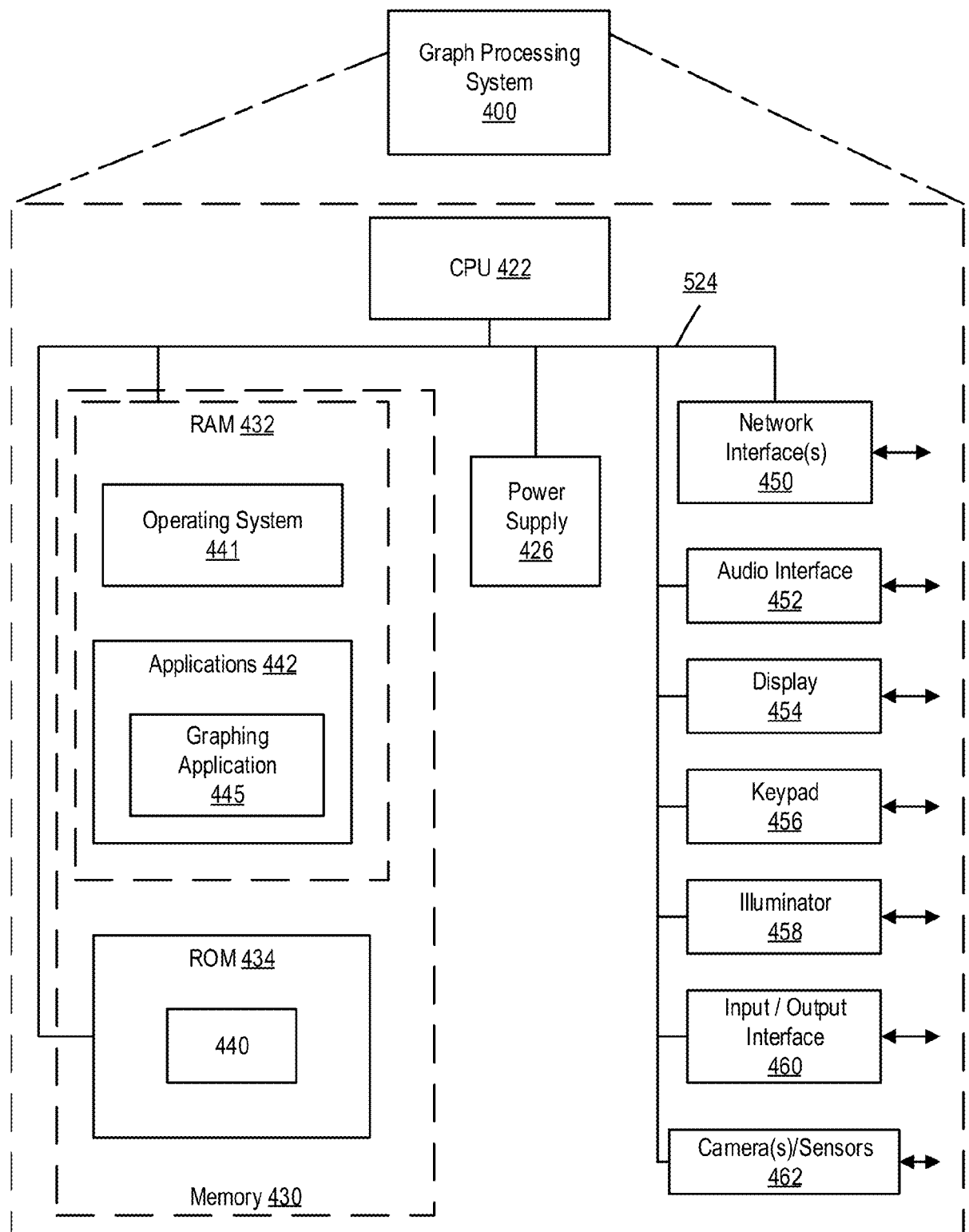
FIG. 4 is a block diagram of a graph processing system according to some embodiments of the disclosure.

FIG. 4 is a block diagram of a graph processing system according to some embodiments of the disclosure.

Graph processing system 400 may include many more or less components than those shown in FIG. 4. However, the components shown are sufficient to disclose an illustrative embodiment for implementing the present disclosure. In some embodiments, some or all of the components depicted in FIG. 4 may implemented in an ASIC, system-on-a-chip, or field programmable gate array (FPGA).

As shown in FIG. 4, graph processing system 400 includes a processing unit (CPU) 422 in communication with a mass memory 430 via a bus 424. graph processing system 400 also includes a power supply 426, one or more network interfaces 450, an audio interface 452, a display 454, a keypad 456, an illuminator 458, an input/output interface 460, and a camera(s) or other optical, thermal or electromagnetic sensors 462. graph processing system 400 can include one camera/sensor 462, or a plurality of cameras/sensors 462, as understood by those of skill in the art.

Power supply 426 provides power to graph processing system 400. A rechargeable or non-rechargeable battery may be used to provide power. The power may also be provided by an external power source, such as an AC adapter or a powered docking cradle that supplements and/or recharges a battery.

Graph processing system 400 may optionally communicate with a base station (not shown), or directly with another computing device. Network interface 450 includes circuitry for coupling graph processing system 400 to one or more networks, and is constructed for use with one or more communication protocols and technologies. Network interface 450 is sometimes known as a transceiver, transceiving device, or network interface card (NIC).

Audio interface 452 is arranged to produce and receive audio signals such as the sound of a human voice. For example, audio interface 452 may be coupled to a speaker and microphone (not shown) to enable telecommunication with others and/or generate an audio acknowledgement for some action. Display 454 may be a liquid crystal display (LCD), gas plasma, light emitting diode (LED), or any other type of display used with a computing device. Display 454 may also include a touch sensitive screen arranged to receive input from an object such as a stylus or a digit from a human hand.

Keypad 456 may comprise any input device arranged to receive input from a user. For example, keypad 456 may include a push button numeric dial, or a keyboard. Keypad 456 may also include command buttons that are associated with selecting and sending images. Illuminator 458 may provide a status indication and/or provide light. Illuminator 458 may remain active for specific periods of time or in response to events. For example, when illuminator 458 is active, it may backlight the buttons on keypad 456 and stay on while the graph processing system is powered. Also, illuminator 458 may backlight these buttons in various patterns when particular actions are performed, such as dialing another client device. Illuminator 458 may also cause light sources positioned within a transparent or translucent case of the client device to illuminate in response to actions.

Graph processing system 400 also comprises input/output interface 460 for communicating with external devices or other input or devices not shown in FIG. 4. Input/output interface 460 can utilize one or more communication technologies, such as USB, infrared, Bluetooth™, or the like.

Mass memory 430 includes a RAM 432, a ROM 434, and other storage means. Mass memory 430 illustrates another example of computer storage media for storage of information such as computer readable instructions, data structures, program modules or other data. Mass memory 430 stores a basic input/output system ("BIOS") 440 for controlling low-level operation of graph processing system 400. The mass memory also stores an operating system 441 for controlling the operation of graph processing system 400. It will be appreciated that this component may include a general purpose operating system such as a version of UNIX, or LINUX™, or a specialized client communication operating system such as Windows Client™, or the Symbian® operating system. The operating system may include, or interface with a Java™ virtual machine module that enables control of hardware components and/or operating system operations via Java™ application programs.

Memory 430 further includes one or more data stores, which can be utilized by graph processing system 400 to store, among other things, applications 442 and/or other data. For example, data stores may be employed to store information that describes various capabilities of graph processing system 400. The information may then be provided to another device based on any of a variety of events, including being sent as part of a header during a communication, sent upon request, or the like. At least a portion of the capability information may also be stored on a disk drive or other storage medium (not shown) within graph processing system 400.

Application 442 may include computer executable instructions which, when executed by graph processing system 400, enable the creation of an multi-dimensional graph as described in connection with FIGS. 1 through 3. In some embodiments, the system 400 may generate a graph based on user input and display the graph via display 454.

FIGS. 5A through 5F illustrate multi-dimensional color graphs according to some embodiments of the disclosure.

Figure 5A:
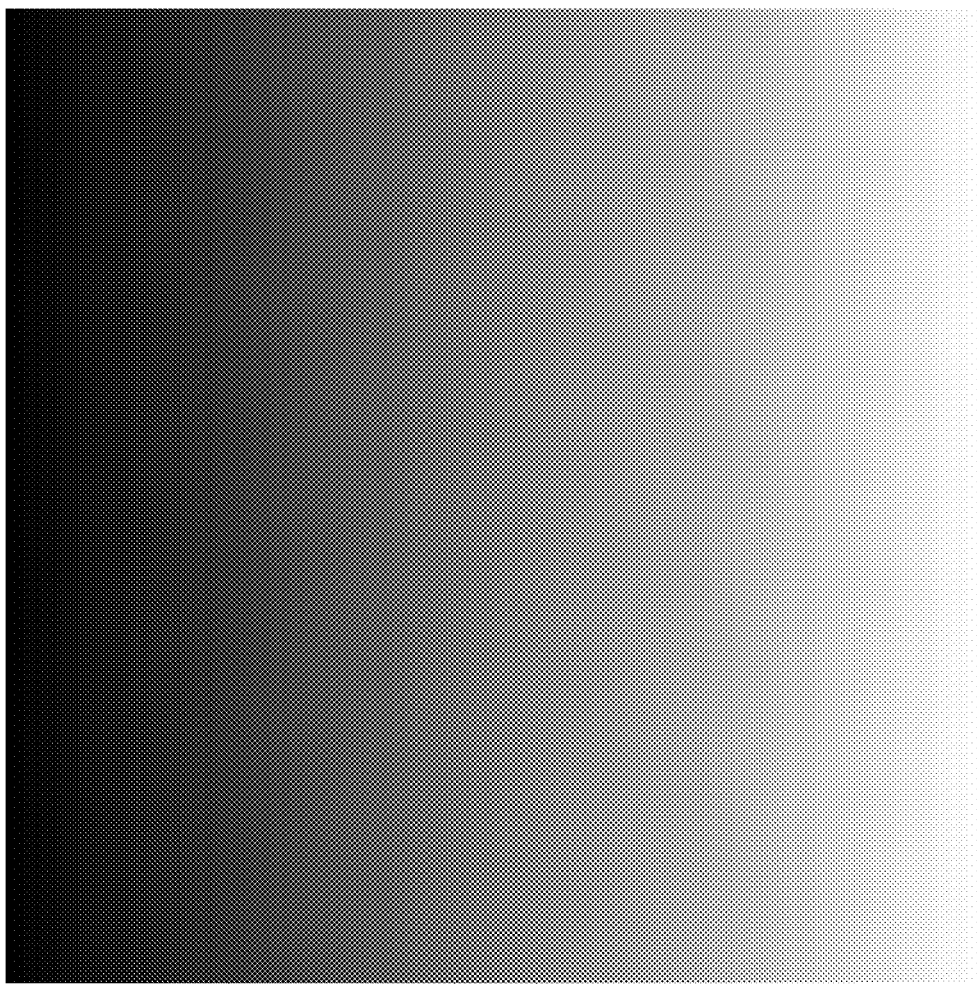
FIGS. 5A through 5F illustrate multi-dimensional color graphs according to some embodiments of the disclosure.

FIG. 5A illustrates a graph having the following base functions:

$$Base_1(x,y)=x;$$

$$Base_2(x,y)=x;$$

$$Base_3(x,y)=x;$$

In this instance bases 1, 2, and 3 are mapped to red, green, and blue color values, each base domain is mapped using a division mapping, and saturation of each base is set to 100%. Notably, since each base is set to the function "x", the resulting color values are grayscale. That is, each RGB point is the same at a given coordinate, thus rendering a grayscale gradient across the x-axis.

Figure 5B:
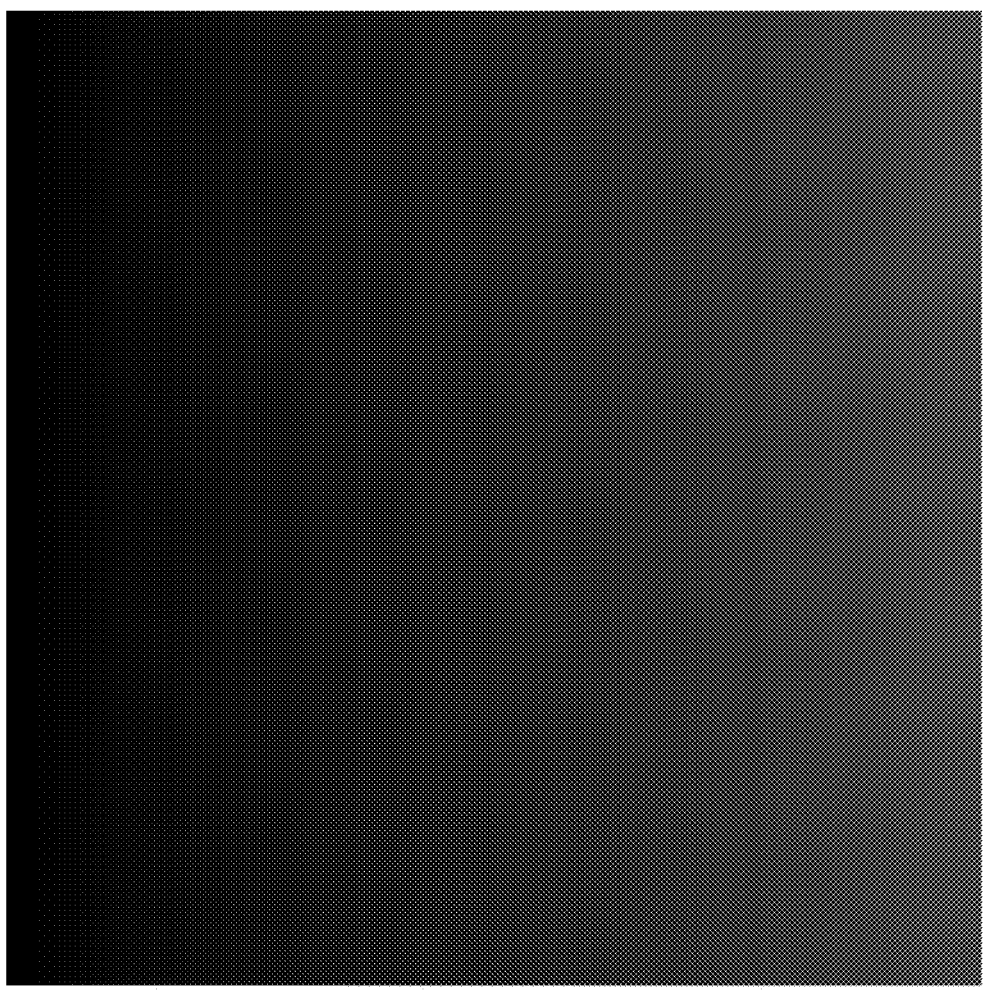

FIG. 5B illustrates a graph having the following base functions:

$$Base_1(x,y)=x;$$

$$Base_2(x,y)=0;$$

$$Base_3(x,y)=0;$$

In this instance bases 1, 2, and 3 are mapped to red, green, and blue color values, each base domain is mapped using a division mapping, and saturation of each base is set to 100%.

Notably, since base 1 is set to the function "x" and the remaining bases are set to a constant zero, the resulting color values are various shades of red. That is, each RGB point only includes a non-zero value for a red component (with the exception of points where x=0) and zero for green and blue components, thus rendering a red gradient across the x-axis.

Figure 5C:
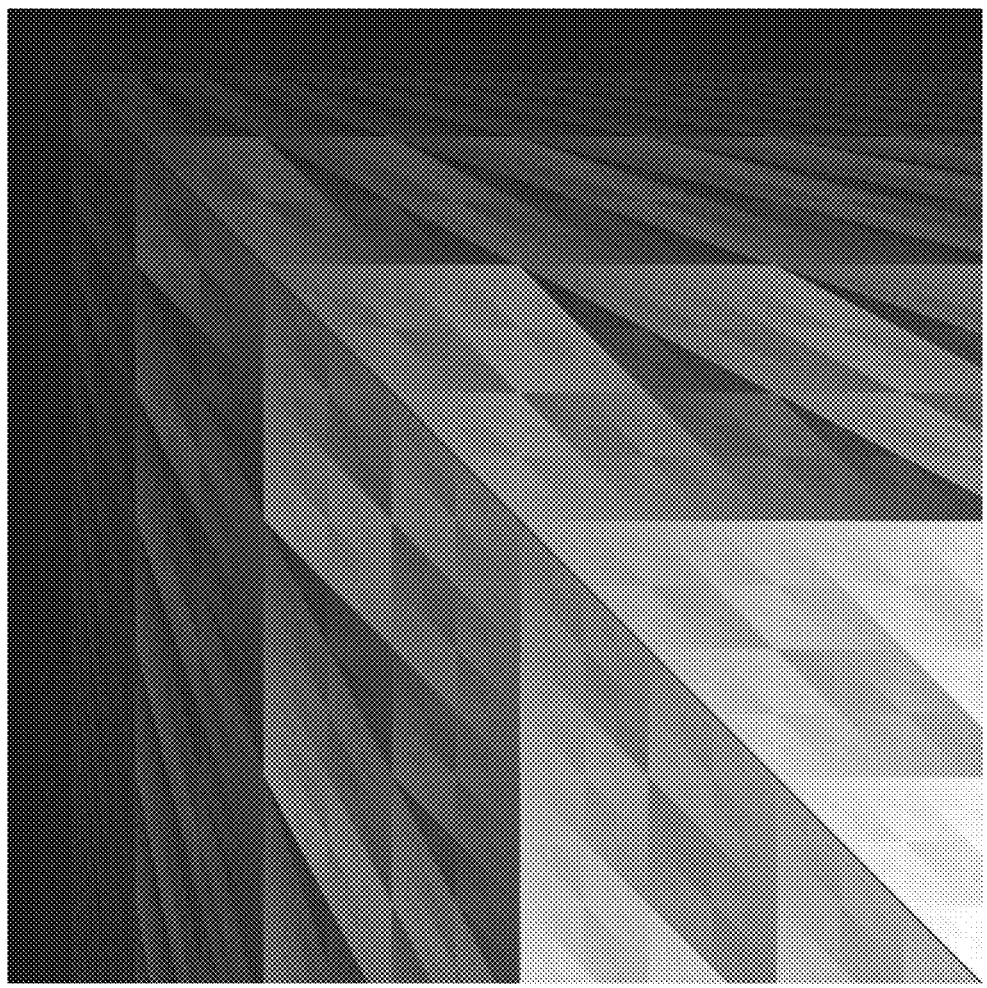

FIG. 5C illustrates a graph having the following base functions:

$Base_1(x,y) = mod[(y),(x)]$;

$Base_2(x,y) = 1$;

$Base_3(x,y) = xor[(mod[(y),(x)]),(mod[(x),(y)])]$;

In this instance bases 1, 2, and 3 are mapped to red, blue, and green color values, each base domain is mapped using a division mapping, and saturation of each base is set to 100%.

Figure 5D:
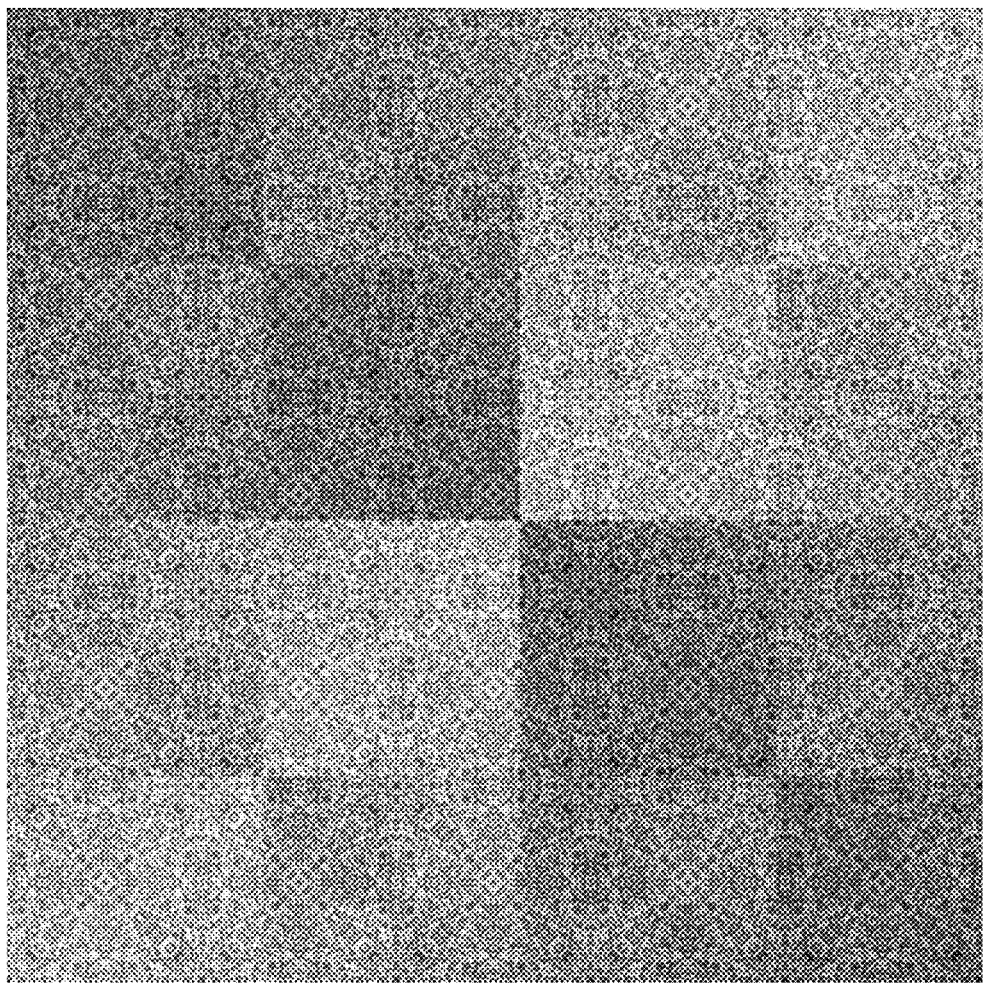

FIG. 5D illustrates a graph having the following base functions:

$Base_1(x,y) = xor[(d \log [97,10,(x^2+y^2)]),(d \log [97,37,(x^2+y^2)])]$;

$Base_2(x,y) = d \log [97,37,(x^2+y^2)]$;

$Base_3(x,y) = xor[(y),(x)]$;

In this instance bases 1, 2, and 3 are mapped to green, blue, and red color values, each base domain is mapped using a division mapping, and saturation of each base is set to 100%.

Figure 5E:
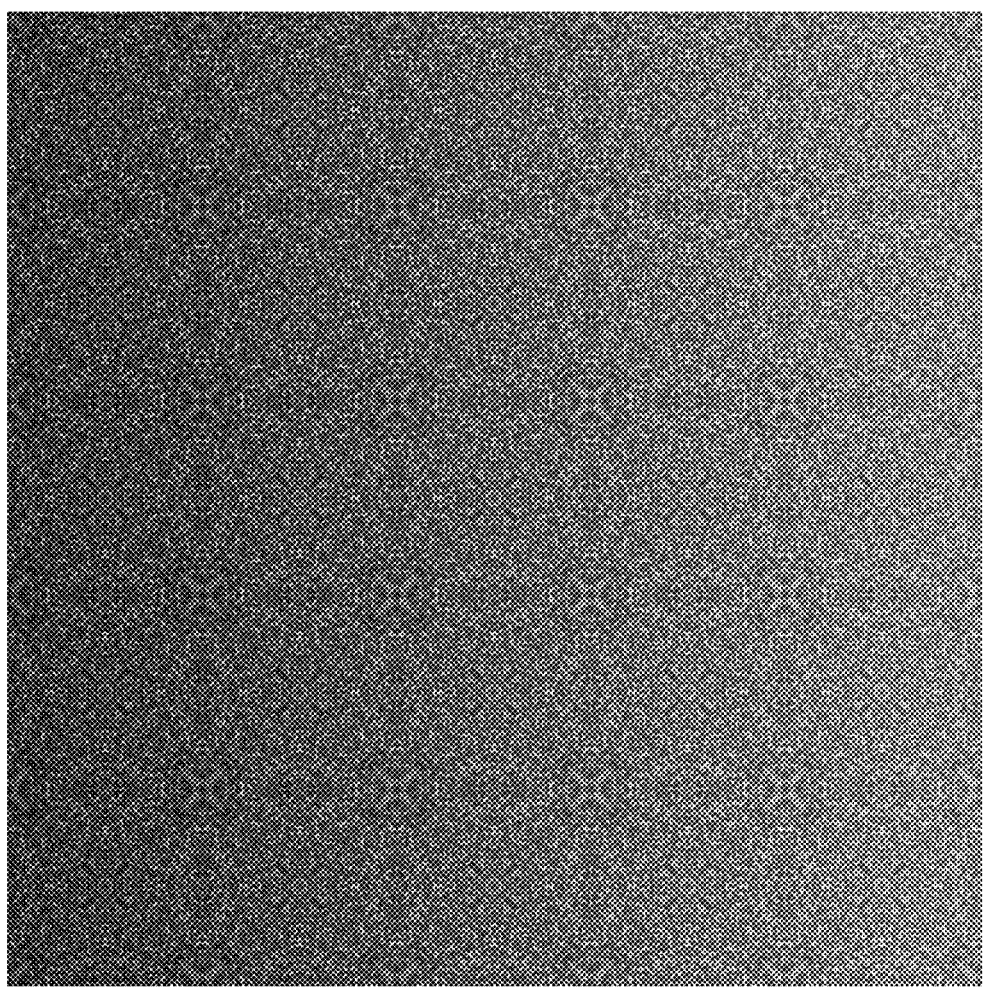

FIG. 5E illustrates a graph having the following base functions:

$Base_1(x,y) = xor[(d \log [97,10,(x^2+y^2)]),(d \log [97,37,(x^2+y^2)])]$;

$Base_2(x,y) = mod[(d \log [97,10,(x^2+y^2)]),(d \log [97,37,(x^2+y^2)])]$;

$Base_3(x,y) = |(x)|$;

In this instance bases 1, 2, and 3 are mapped to blue, green, and red color values, each base domain is mapped using a division mapping, and saturation of each base is set to 100%.

Figure 5F:
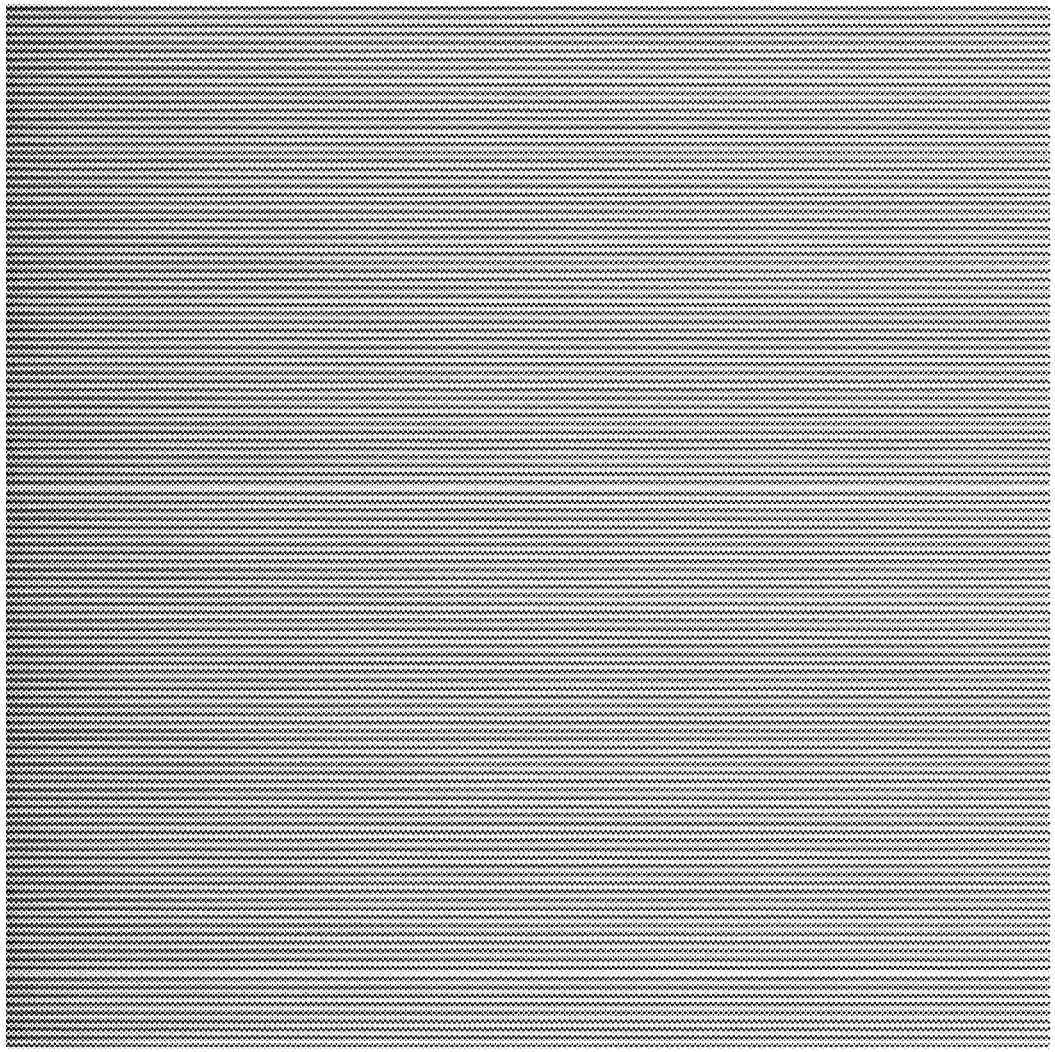

FIG. 5F illustrates a graph having the following base functions:

$Base_1(x,y) = x$;

$Base_2(x,y) = \cos(y)$;

$Base_3(x,y) = 0$;

In this instance bases 1, 2, and 3 are mapped to red, green, and blue color values and saturation of each base is set to 100%. Notably, the domain of base functions 1 and 2 are mapped using a logarithmic mapping. Thus, the strength of these bases increases logarithmic about the x-axis.

As illustrated in FIGS. 5A through 5F, the described embodiments allow for the intuitive mapping of complex multi-dimensional functions. Additionally, as depicted in FIGS. 6A through 6C, a custom user interface allows for the display of the graph alongside each base function. Thus, a user can manipulate the base functions and view the resulting graph in real-time allowing for better comprehension of multi-dimensional functions and the effects of modifying said functions.

FIGS. 6A through 6C illustrate user interfaces for generating multi-dimensional color graphs according to some embodiments of the disclosure.

FIG. 6A illustrates a user interface in "function mode" according to some embodiments of the disclosure.

As illustrated in FIG. 6A, a user interface 601 is configured to display a multi-dimensional color graph 603 in response to various user inputs received via panels 605, 607, 609, and 611. In one embodiment, a graph 603 is generated in response to a user clicking button 615a. In some embodiments, the graph 603 can be created by "listening" to changes in the user interface elements in each of the panels 605, 607, 609, and 611.

Panel 605 includes a color scheme selector comprising a dropdown menu of various permutations of RGB or CMY color bases, although other bases may be utilized. Panel 605 additionally includes a "Swap Colors" button configured to cycle through the permutations of color bases.

Panel 607 includes three function input text boxes corresponding to the color bases assigned in panel 605. Each text box in panel 607 is configured to receive a function string input from a user. The function strings may include any combination of supported functions defining a transformation of x and y coordinates to a color value for the respective base, as discussed previously.

Panel 609 includes saturation sliders for each color base. The saturation sliders adjust, for each base, a multiplicative percentage to increase or decrease saturation of the color base.

Panel 611 includes a plurality of domain configuration inputs operative to adjust the domain of the x and y coordinates used by the graph. As illustrated in the panel 611, a user may set the height and width of the resulting graph 603 via the text boxes associated with the height and width labels. For each base (e.g., RGB), the user may also specific (for both the x and y domains) a mapping function (e.g., for field "x1[n]=") and an initial value (e.g., for field "Initial x: 1 values"). Additionally, the user may select either a division or logarithmic mapping mode as discussed previously.

Panel 613 illustrates a group generation interface. As illustrated, panel 613 includes a prime number text box configured to receive a prime number as input from the user. In response to selecting the "Get Group Generators" button, the user interface displays a list of generators for use in cryptographic functions as described previously.

User interface 601 in FIG. 6A additionally includes buttons 615a, 615b, 615c, 615d, 615e, and 615f for creating a graph, saving an image of the graph, saving an image and basic data, saving an image and full data, switching to data mode, and switching to designer mode, respectively.

FIG. 6B illustrates a user interface in "data mode" according to some embodiments of the disclosure.

As illustrated, user interface 601 includes a graph 603 as discussed in connection with FIG. 6A. In the illustrated embodiment, graph 603 is generated based on an exported file loaded into the user interface by a user.

Panel 617 illustrates a file import panel that allows a user to specify the location in the file system where an exported file is located.

Panel 619 illustrates a domain configuration panel that allows the user to set the height, width, and point size of the resulting graph. Additionally, panel 619 allows the user to re-order the x, y, and color values. That is, a user may swap color values or x, y values as desired. In general, each component (e.g., x, y, R, G, B) may be mapped to a base function (1, 2, 3) or input parameter (x, y). Panel 619 additionally allows a user to specify a minimum and maximum value for each component.

Panel 621 includes saturation sliders for each color base. The saturation sliders adjust, for each base, a multiplicative percentage to increase or decrease saturation of the color base User interface 601 in FIG. 6B additionally includes buttons 615*a*, 615*b*, 615*g*, and 615*f* for creating a graph, saving an image of the graph, switching to function mode (FIG. 6A), and switching to designer mode (FIG. 6C), respectively.

FIG. 6C illustrates a user interface in "designer mode" according to some embodiments of the disclosure.

As illustrated, user interface 601 includes a graph 603 as discussed in connection with FIGS. 6A and 6B. In the illustrated embodiment, graph 603 is generated based on function templates selected by the user interface by a user.

Panel 605 includes a color scheme selector comprising a dropdown menu of various permutations of RGB or CMY color bases, although other bases may be utilized. Panel 605 additionally includes a "Swap Colors" button configured to cycle through the permutations of color bases.

Panels 623*a*, 623*b*, and 623*c* depict function template panels for the circular transition, basic, and 3D Perspective 1 function templates described previously. Notably, each panel may be updated based on the selected function template. Available function templates are described previously.

Each panel 623*a*, 623*b*, and 623*c* includes various user interface elements for customizing the function template. The layout of user interface elements varies based on the configurable parameters of each function template (discussed previously).

In the illustrated example, panel 623*a* (circular transition) includes user interface elements for adjusting the mode and phase of the template as well as the vertical and horizontal alignment and the vertical and horizontal modifier. Panel 623*a* additionally includes elements for inverting the function horizontally or vertically and adding distortion to the function (e.g., divisionally or logarithmically mapping the domain). Panel 623*a* additionally includes a saturation slider for adjusting the saturation of the base function.

In the illustrated example, panel 623*b* (basic) includes user interface elements for adjusting the mode of the template. Panel 623*b* additionally includes elements for inverting the function horizontally or vertically and adding distortion to the function (e.g., divisionally or logarithmically mapping the domain). Panel 623*b* additionally includes a saturation slider for adjusting the saturation of the base function.

In the illustrated example, panel 623*c* (3D Perspective 1) includes user interface elements for adjusting the mode and phase of the template as well as the vertical and horizontal alignment and the vertical and horizontal modifier. Panel 623*c* additionally includes elements for inverting the function horizontally or vertically and adding distortion to the function (e.g., divisionally or logarithmically mapping the domain). Panel 623*c* additionally includes user interface elements for adjusting the parameters of the functions (adjusters 1-4). Panel 623*b* additionally includes a saturation slider for adjusting the saturation of the base function.

User interface 601 in FIG. 6C additionally includes buttons 615*a*, 615*b*, 615*g*, and 615*e* for creating a graph, saving an image of the graph, switching to function mode (FIG. 6A), and switching to data mode (FIG. 6B), respectively In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

The subject matter described above may be embodied in a variety of different forms and, therefore, the application/description intends for covered or claimed subject matter to be construed as not being limited to any example embodiments set forth herein; example embodiments are provided merely to be illustrative. Likewise, the application/description intends a reasonably broad scope for claimed or covered subject matter. Among other things, for example, subject matter may be embodied as methods, devices, components, or systems. Accordingly, embodiments may, for example, take the form of hardware, software, firmware or any combination thereof (other than software per se). The description presented above is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. The application/description intends, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium that can be used to tangibly store the desired information or data or instructions and that can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application that receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving a plurality of base function strings, each of the base function strings associated with a color base and comprising a textual string input by a user including one or more supported functions;
    parsing the base function strings to generate a matrix of functions, the matrix of functions represented as at least one abstract syntax tree (AST) where the AST includes at least cryptographic functions including at least either a discrete logarithm function or a Diffie-Hellman function;
    calculating generators for the cryptographic functions prior to application of the cryptographic functions, the calculating generators including producing a list of every generator element of the group of integers under multiplication modulo p where p is a user-selected prime number for use in the cryptographic functions;
    calculating, for each coordinate in a set of coordinates, a color value for the coordinate using the matrix of functions;
    generating a graph based on the calculated color values associated with each coordinate; and
    displaying the generated graph.

2. The method of claim 1 wherein the one or more supported functions comprise functions selected from the group of custom functions, basic functions, trigonometric functions, and logic functions E.

3. The method of claim 2,
    wherein the basic functions include constant, polynomial, floor, ceiling, absolute value, modulus, log, and self functions,
    wherein the trigonometric functions include sine, cosine, tangent, cosecant, secant, and cotangent functions, and
    wherein the logic functions include and, or, not, xor, implies, and iff functions.

4. The method of claim 1 wherein receiving a plurality of base function strings comprises receiving the selection of a function template from a plurality of function templates, wherein the plurality of function templates comprise textual strings of supported functions.

5. The method of claim 4 wherein the function templates include one or more configurable parameters.

6. The method of claim 1 wherein receiving a plurality of base function strings comprises extracting the plurality of base function strings from a file.

7. The method of claim 1 wherein the matrix of functions comprises one or more columns of function objects.

8. The method of claim 7 wherein calculating a color value for the coordinate using the matrix of functions comprises:
    selecting a first column from the one or more columns of functions objects;
    calculating a term color value for each function object in the first column; and
    multiplying the term color values to obtain the color value for the first column.

9. The method of claim 1 further comprising adjusting the saturation of each computed color value prior to generating the graph.

10. The method of claim 1 further comprising adjusting the domain of the coordinates prior to calculating a color value for the coordinate using the matrix of functions.

11. The method of claim 10 wherein adjusting the domain of the coordinates comprises offsetting the coordinates by a predetermined distance.

12. The method of claim 1 wherein calculating a color value for a coordinate using the matrix of functions further comprises adjusting the calculated color value according to an adjustment parameter.

13. The method of claim 12 wherein the adjustment parameter represents a divisional mapping of calculated color values to displayed color values.

14. The method of claim 12 wherein the adjustment parameter represents a logarithmic mapping of calculated color values to displayed color values.

15. A apparatus comprising:
one or more processors; and
a non-transitory memory storing computer-executable instructions therein that, when executed by the processors, cause the apparatus to perform the operations of:
  receiving a plurality of base function strings, each of the base function strings associated with a color base and comprising a textual string input by a user including one or more supported functions;
  parsing the base function strings to generate a matrix of functions, the matrix of functions represented as at least one abstract syntax tree (AST) where the AST includes at least cryptographic functions including at least either a discrete logarithm function or a Diffie-Hellman function;
  calculating generators for the cryptographic functions prior to application of the cryptographic functions, the calculating generators including producing a list of every generator element of the group of integers under multiplication modulo p where p is a user-selected prime number for use in the cryptographic functions;
  calculating, for each coordinate in a set of coordinates, a color value for the coordinate using the matrix of functions;
  generating a graph based on the calculated color values associated with each coordinate; and
  displaying the generated graph.

16. The apparatus of claim 15 wherein the one or more supported functions comprise functions selected from the group of custom functions, basic functions, trigonometric functions, and logic functions, wherein basic functions include constant, polynomial, floor, ceiling, absolute value, modulus, log, and self functions, wherein trigonometric functions include sine, cosine, tangent, cosecant, secant, and cotangent functions, and wherein logic functions include and, or, not, xor, implies, and iff functions.

17. The apparatus of claim 15 wherein the instructions further cause the apparatus to adjust the saturation of each computed color value prior to generating the graph.

18. The apparatus of claim 15 wherein the instructions further cause the apparatus to perform the operation of adjusting the domain of the coordinates prior to calculating a color value for the coordinate using the matrix of functions.

19. The apparatus of claim 15 wherein calculating a color value for a coordinate using the matrix of functions further comprises adjusting the calculated color value according to an adjustment parameter and wherein the adjustment parameter represents a divisional or logarithmic mapping of calculated color values to displayed color values.

* * * * *